US010496950B2

(12) United States Patent
Parris

(10) Patent No.: US 10,496,950 B2
(45) Date of Patent: Dec. 3, 2019

(54) SYSTEMS, METHODS, AND COMPUTER PROGRAM PRODUCTS FOR PROVIDING INTELLIGENT VISIBILITY ACROSS AN OUTCOME-BASED SERVICE CYCLE INFRASTRUCTURE

(71) Applicant: United Parcel Service of America, Inc., Atlanta, GA (US)

(72) Inventor: Carrie Parris, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 772 days.

(21) Appl. No.: 14/182,092

(22) Filed: Feb. 17, 2014

(65) Prior Publication Data

US 2015/0235171 A1 Aug. 20, 2015

(51) Int. Cl.
*G06Q 10/08* (2012.01)
(52) U.S. Cl.
CPC .............. *G06Q 10/0833* (2013.01)
(58) Field of Classification Search
None
See application file for complete search history.

(56) References Cited

U.S. PATENT DOCUMENTS

| | | | | |
|---|---|---|---|---|
| 5,590,060 A | * | 12/1996 | Granville | G01B 11/002 356/394 |
| 5,646,870 A | * | 7/1997 | Krivokapic | G03F 7/70625 700/117 |
| 2001/0034673 A1 | * | 10/2001 | Yang | G06Q 10/06311 705/28 |
| 2007/0282583 A1 | * | 12/2007 | Kapadi | G06Q 10/04 703/11 |
| 2009/0106002 A1 | * | 4/2009 | Viswanathan | G05B 17/02 703/6 |
| 2014/0019471 A1 | * | 1/2014 | Linton | G06N 5/02 707/759 |

* cited by examiner

*Primary Examiner* — Valerie Lubin
(74) *Attorney, Agent, or Firm* — Shook, Hardy & Bacon L.L.P.

(57) ABSTRACT

Various embodiments provide a service cycle management system for intelligently evaluating one or more parameters of a reverse service cycle loop within a supply chain management infrastructure. The system comprises one or more processors configured to: receive the real-time data comprising one or more parameters associated with execution of one or more service tasks; retrieve the simulation data from the one or more memory storage areas; dynamically compare one or more parameters within the real-time data against corresponding one or more parameters within the simulation data to identify one or more discrepancies therebetween; in response to identifying one or more discrepancies, and generating one or more representations thereof, so as to inform one or more users of the system of one or more areas for focusing future initiatives. Associated computer program products and computer implemented methods are also provided.

18 Claims, 17 Drawing Sheets

SYSTEMS, METHODS, AND COMPUTER PROGRAM PRODUCTS FOR PROVIDING INTELLIGENT VISIBILITY ACROSS AN OUTCOME-BASED SERVICE CYCLE INFRASTRUCTURE

BACKGROUND

Conventional service cycle management models place primary decision-making responsibility upon the owners of assets or commodity items subject to service cycle maintenance, replacement, and/or replenishment programs. Beyond making a plurality of decisions regarding multiple aspects of the supply chain process, particularly in the context of reverse loop transport of assets or commodity items, such conventional models further force the owners to communicate, negotiate, and interface routinely with multiple service providers. As a result of such models, the multi-faceted nature of service cycle management introduces a variety of inefficiencies of scale. Still further, such inefficiencies contribute to discrepancies between actual performance and asset or commodity item owner desired outcomes.

Thus, a need exists for an integrated platform that consolidates all facets of the service cycle management so as to improve the efficiency and accuracy thereof, in particular with respect to satisfying asset or commodity item owner outcome-based desires. A need further exists for an associated tool for measuring the effectiveness of such an integrated platform at achieving its capabilities from at least a performance perspective.

BRIEF SUMMARY

According to various embodiments of the present invention, a service cycle management system is provided for intelligently evaluating one or more parameters of a reverse service cycle loop within a supply chain management infrastructure associated with a multi-provider network. The system comprises: one or more memory storage areas containing real-time data associated with one or more components within the reverse service cycle loop and simulation data associated with the one or more components within the reverse service cycle loop; and one or more computer processors. The processors are configured to: receive the real-time data comprising one or more parameters associated with execution of one or more service tasks by one or more service providers within the supply chain management infrastructure; retrieve the simulation data from the one or more memory storage areas; dynamically compare one or more parameters within the real-time data against corresponding one or more parameters within the simulation data to identify one or more discrepancies there-between; in response to identifying one or more discrepancies, generating one or more representations thereof, so as to inform one or more users of the system of one or more areas for focusing future initiatives; and in response to not identifying one or more discrepancies, generating one or more notifications thereof to the one or more users of the system.

According to various embodiments of the present invention, a computer-implemented method is provided for intelligently evaluating one or more parameters of a reverse service cycle loop within a supply chain management infrastructure associated with a multi-provider network. Various embodiments of the method comprise the steps of: receiving and storing within one or more memory storage areas simulation data associated with the one or more components within the reverse service cycle loop; receiving real-time data associated with one or more components within the reverse service cycle loop, the real-time data comprising one or more parameters associated with execution of one or more service tasks by one or more service providers within the supply chain management infrastructure; dynamically comparing, via at least one computer processor, one or more parameters within the real-time data against corresponding one or more parameters within the simulation data to identify one or more discrepancies there-between; in response to identifying one or more discrepancies, generating, via the at least one computer processor, one or more representations thereof, so as to inform one or more users of the system of one or more areas for focusing future initiatives; and in response to not identifying one or more discrepancies, generating, via the at least one computer processor, one or more notifications thereof to the one or more users of the system.

According to various embodiments of the present invention, a non-transitory computer program product is provided comprising at least one computer-readable storage medium having computer-readable program code portions embodied therein. The computer-readable program code portions comprise: an executable portion configured for receiving a plurality of data, wherein the data comprises: (i) real-time data associated with one or more components within a reverse service cycle loop within a supply chain management infrastructure associated with a multi-provider network; and (ii) simulation data associated with the one or more components within the reverse service cycle loop. The computer-readable program code portions further comprise: an executable portion configured for dynamically comparing one or more parameters within the real-time data against corresponding one or more parameters within the simulation data to identify one or more discrepancies there-between, the one or more real-time data parameters being associated with execution of one or more service tasks by one or more service providers within the supply chain management infrastructure; and an executable portion configured for: (i) in response to identifying one or more discrepancies, generating one or more representations thereof, so as to inform one or more users of the system of one or more areas for focusing future initiatives; and (ii) in response to not identifying one or more discrepancies, generating one or more notifications thereof to the one or more users of the system.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 1:
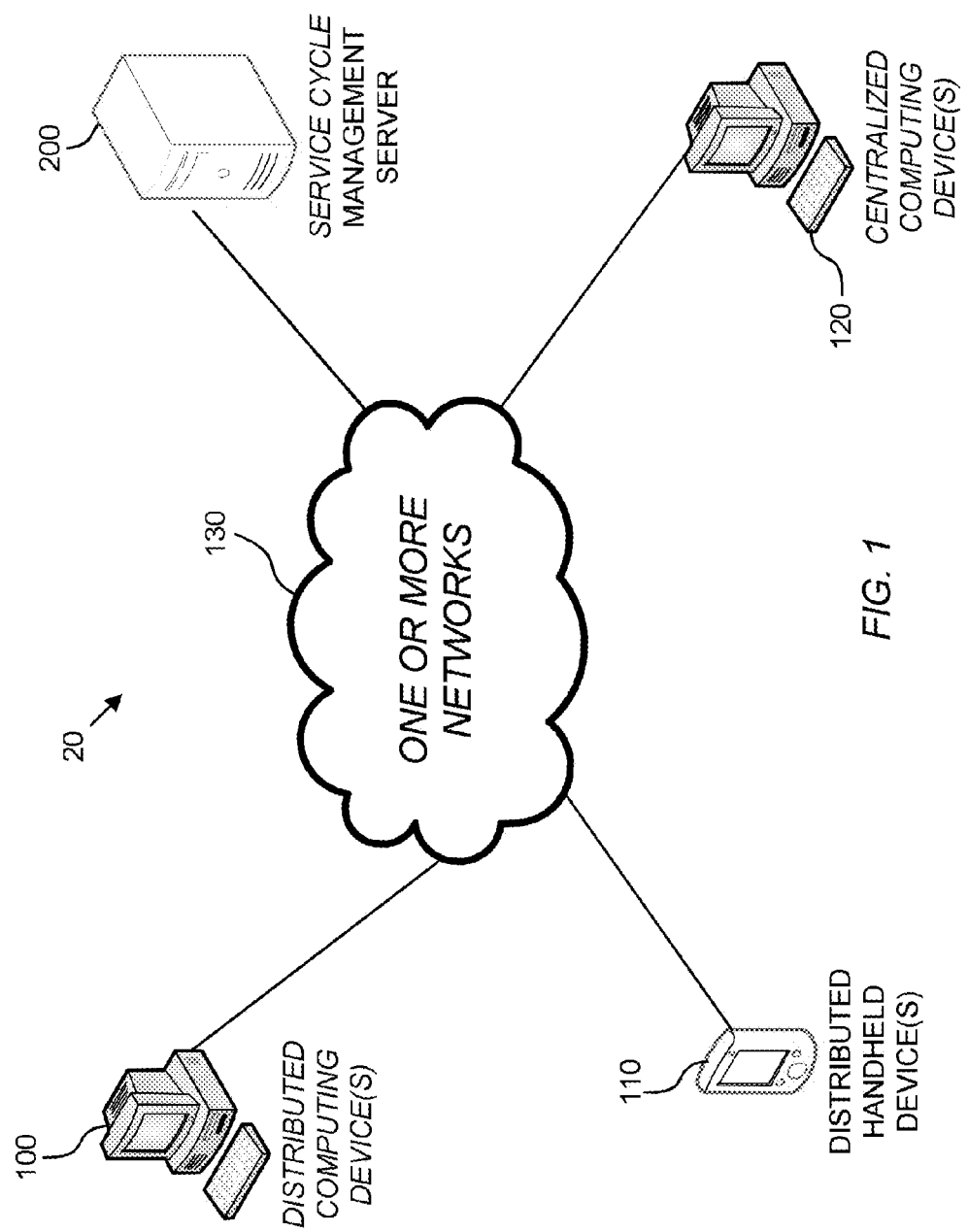
FIG. 1 is a block diagram of an outcome-based service cycle management system 20 according to various embodiments.
Figure 2:
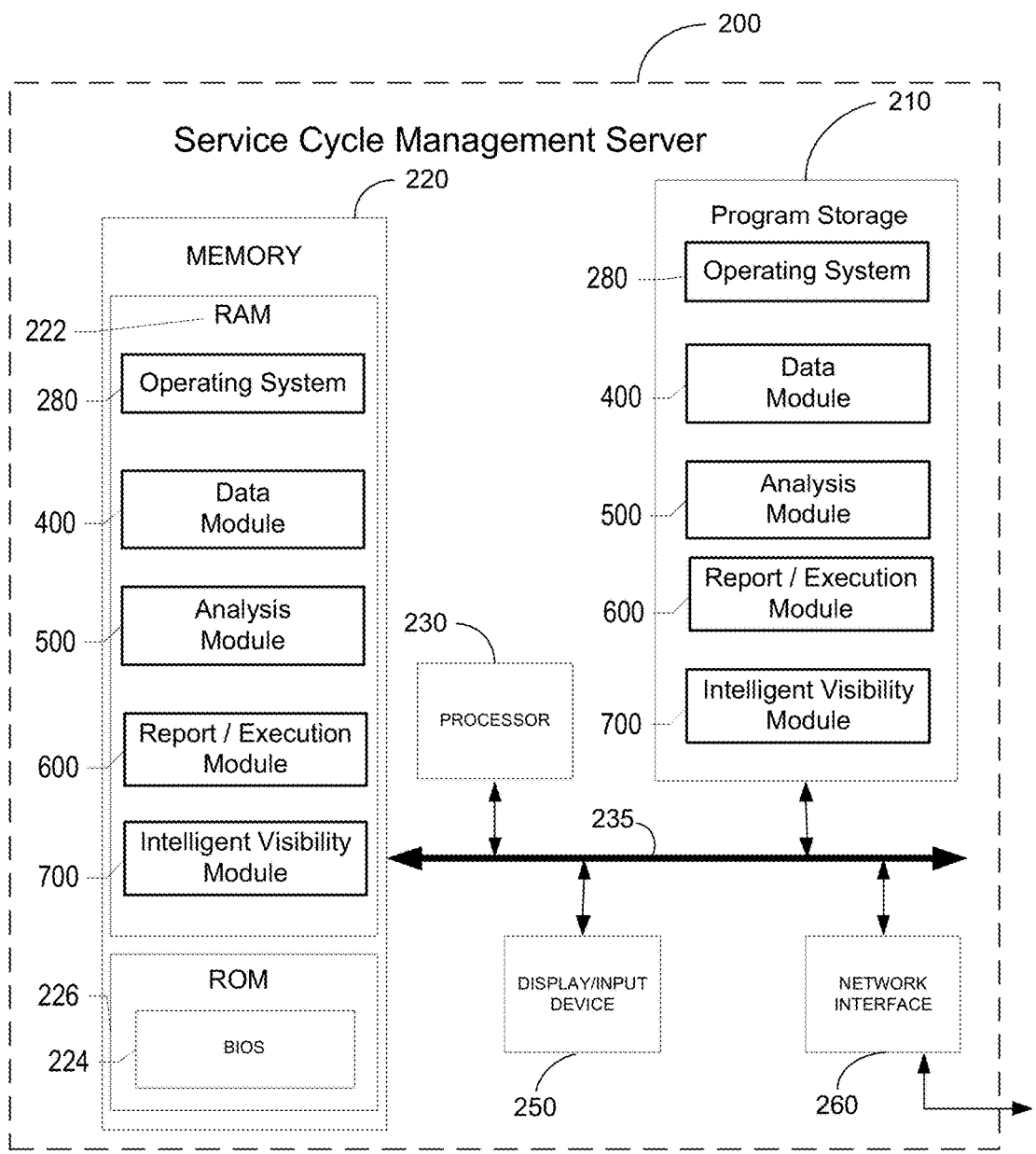
FIG. 2 is schematic block diagram of a service cycle management server 200 according to various embodiments.
Figure 3:
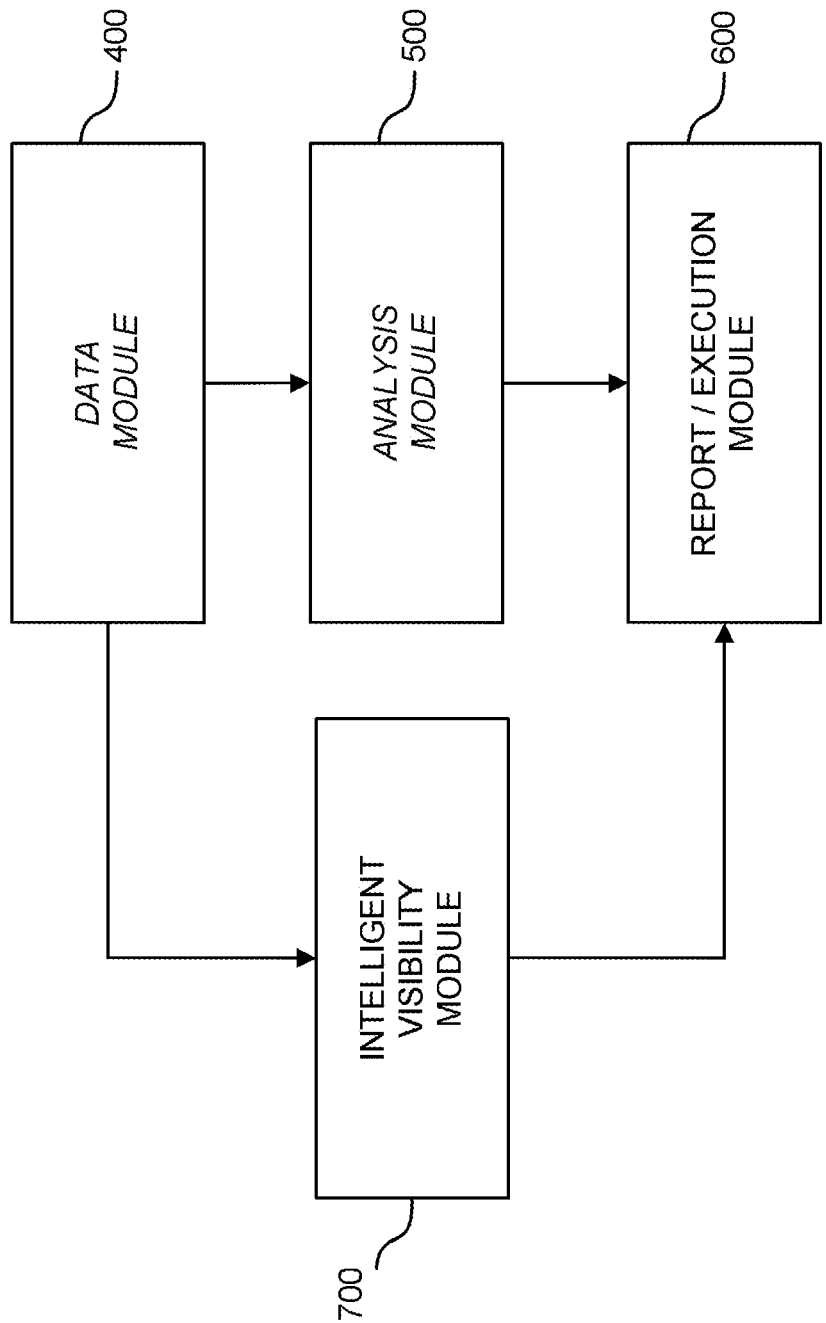
FIG. 3 illustrates an overall process flow for various modules of the service cycle management server 200 according to various embodiments.
Figure 5:
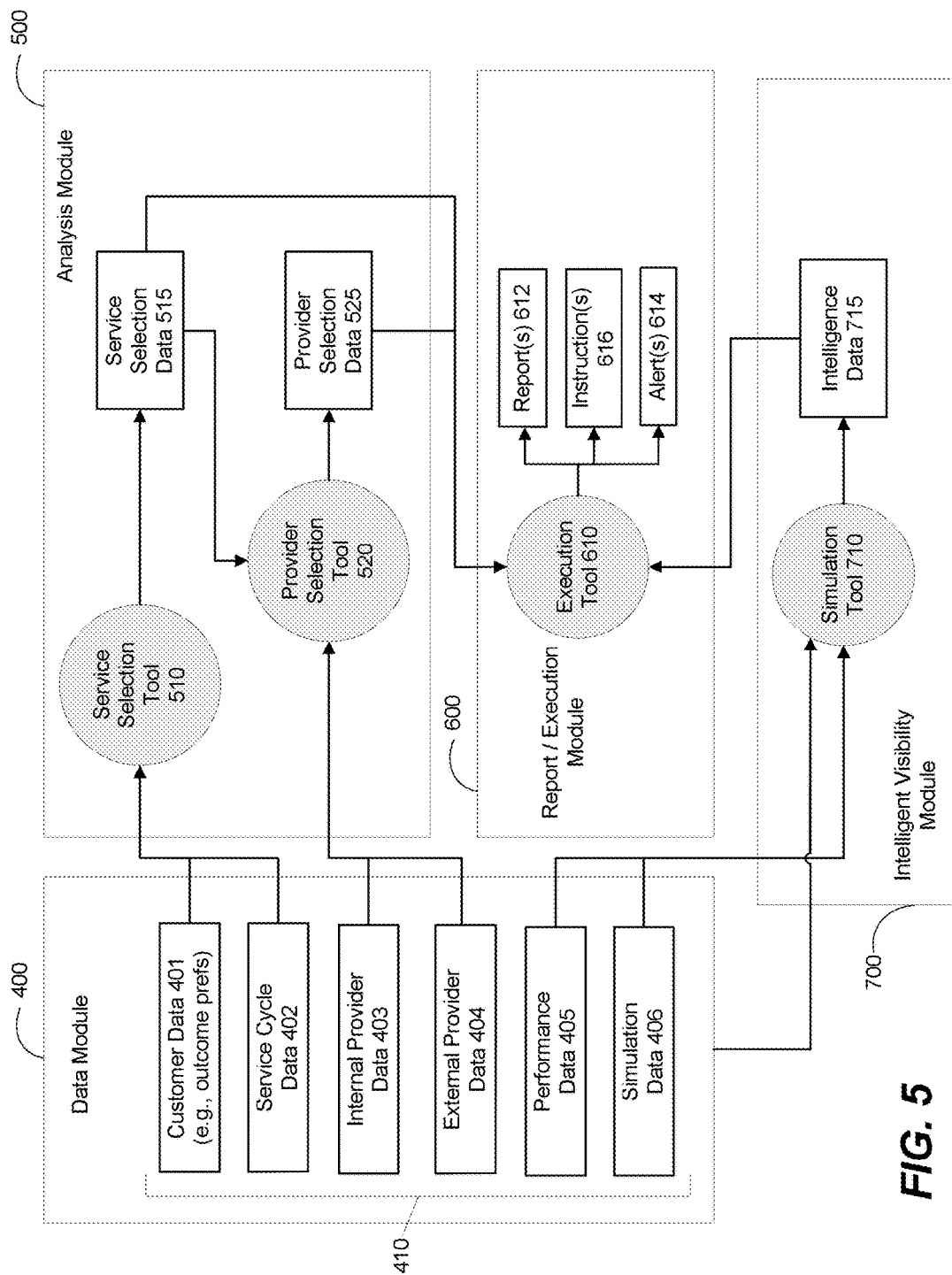
Figure 6:
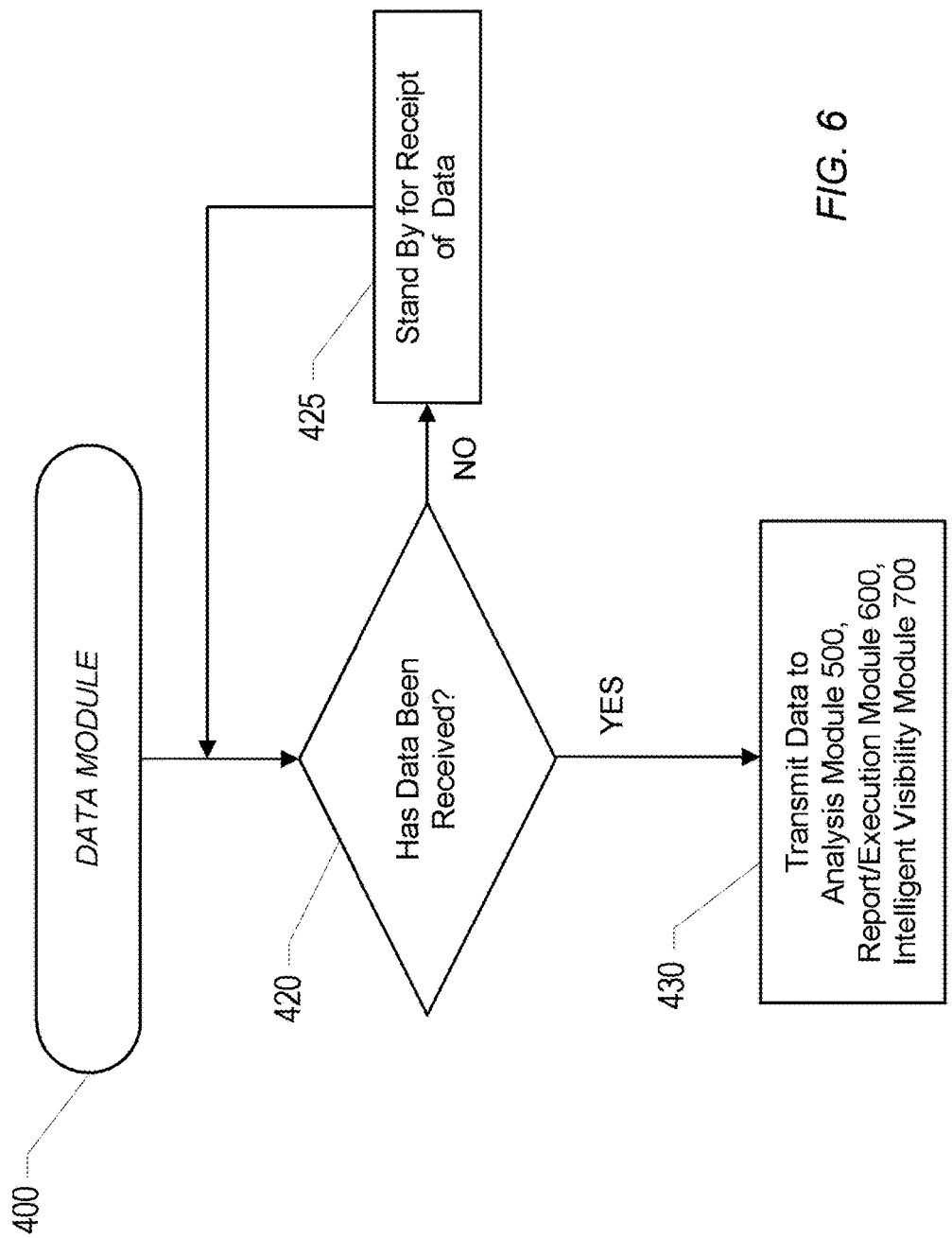
Figure 7:
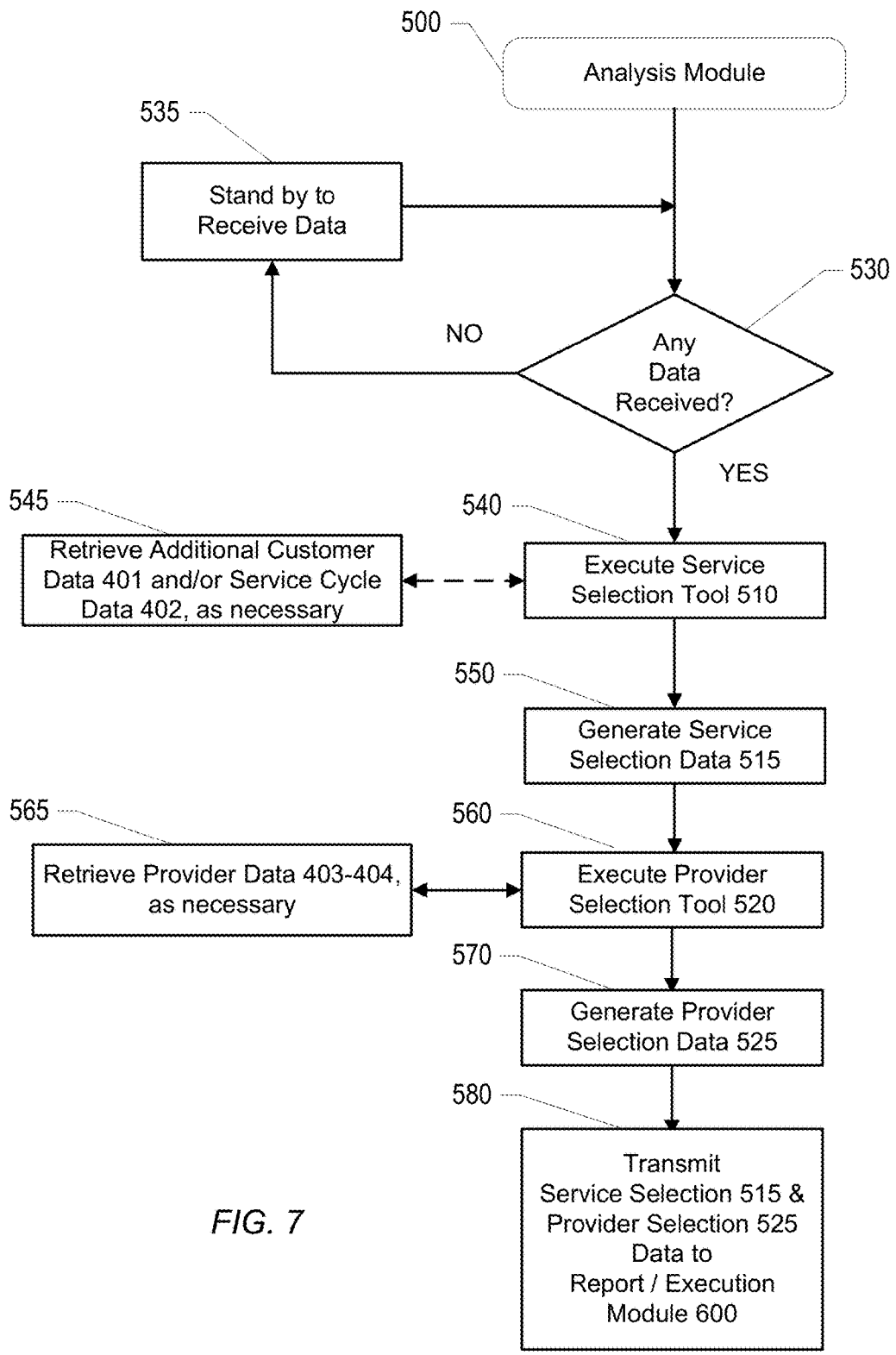
Figure 8:
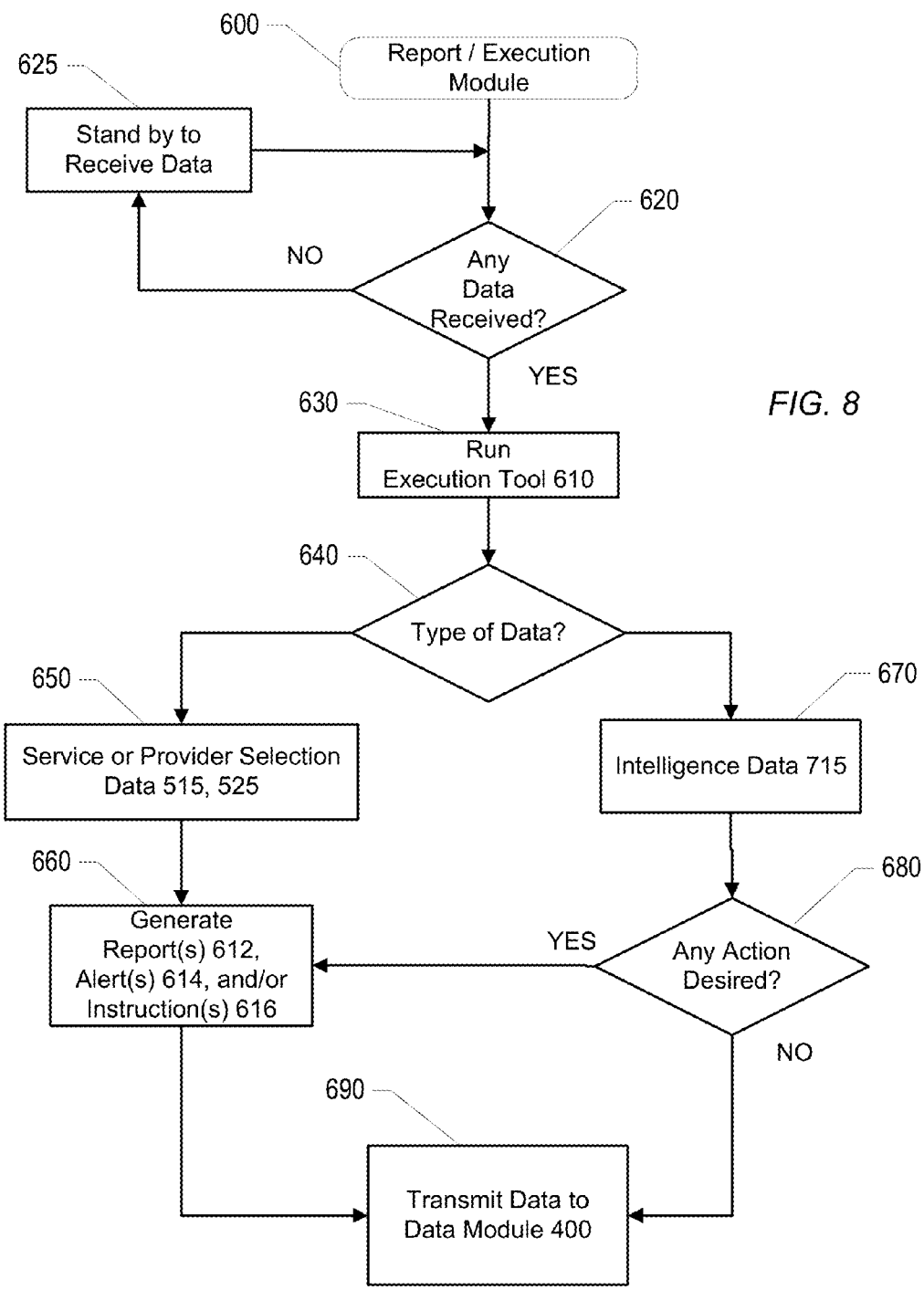
Figure 9:
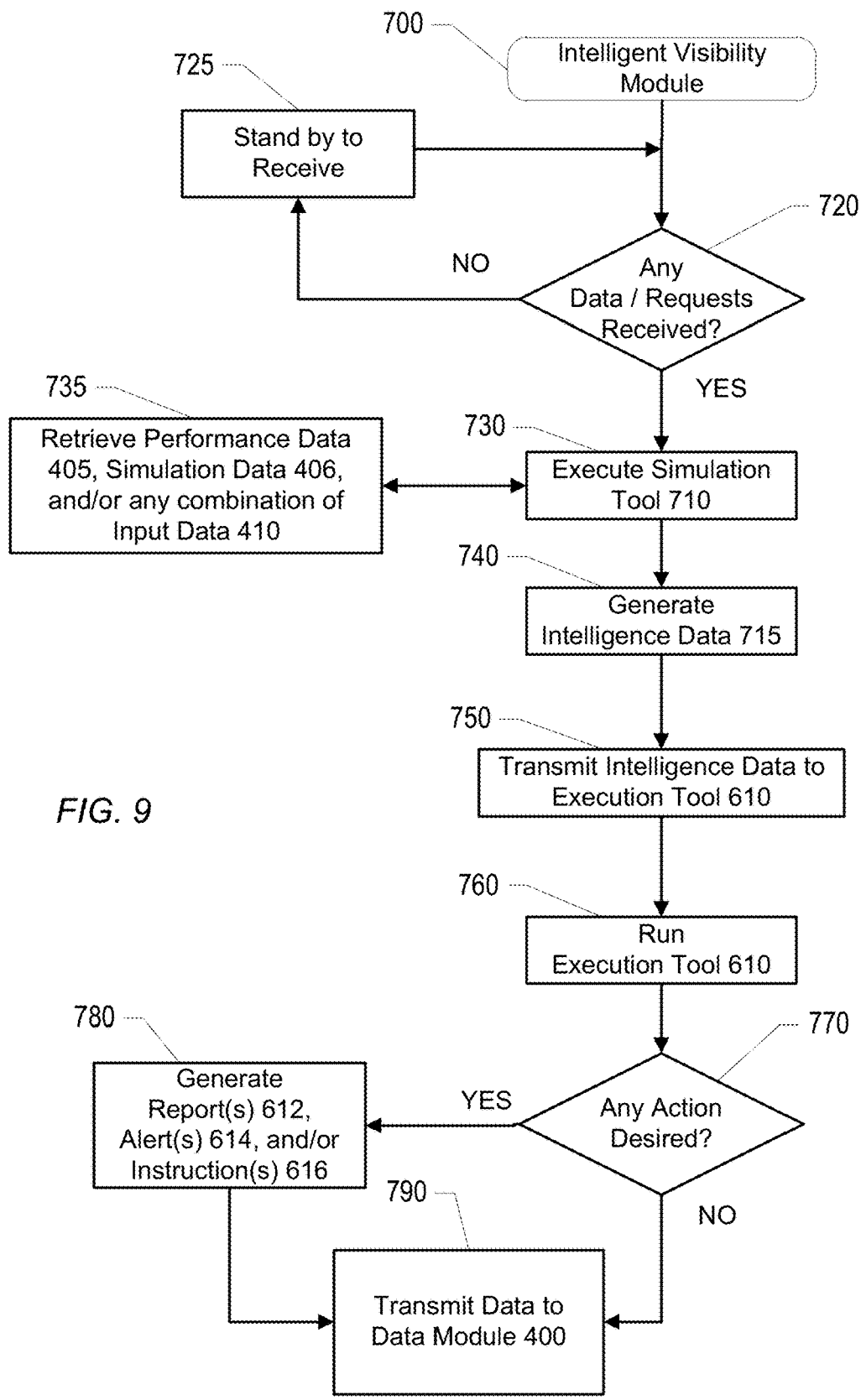
Figure 10:
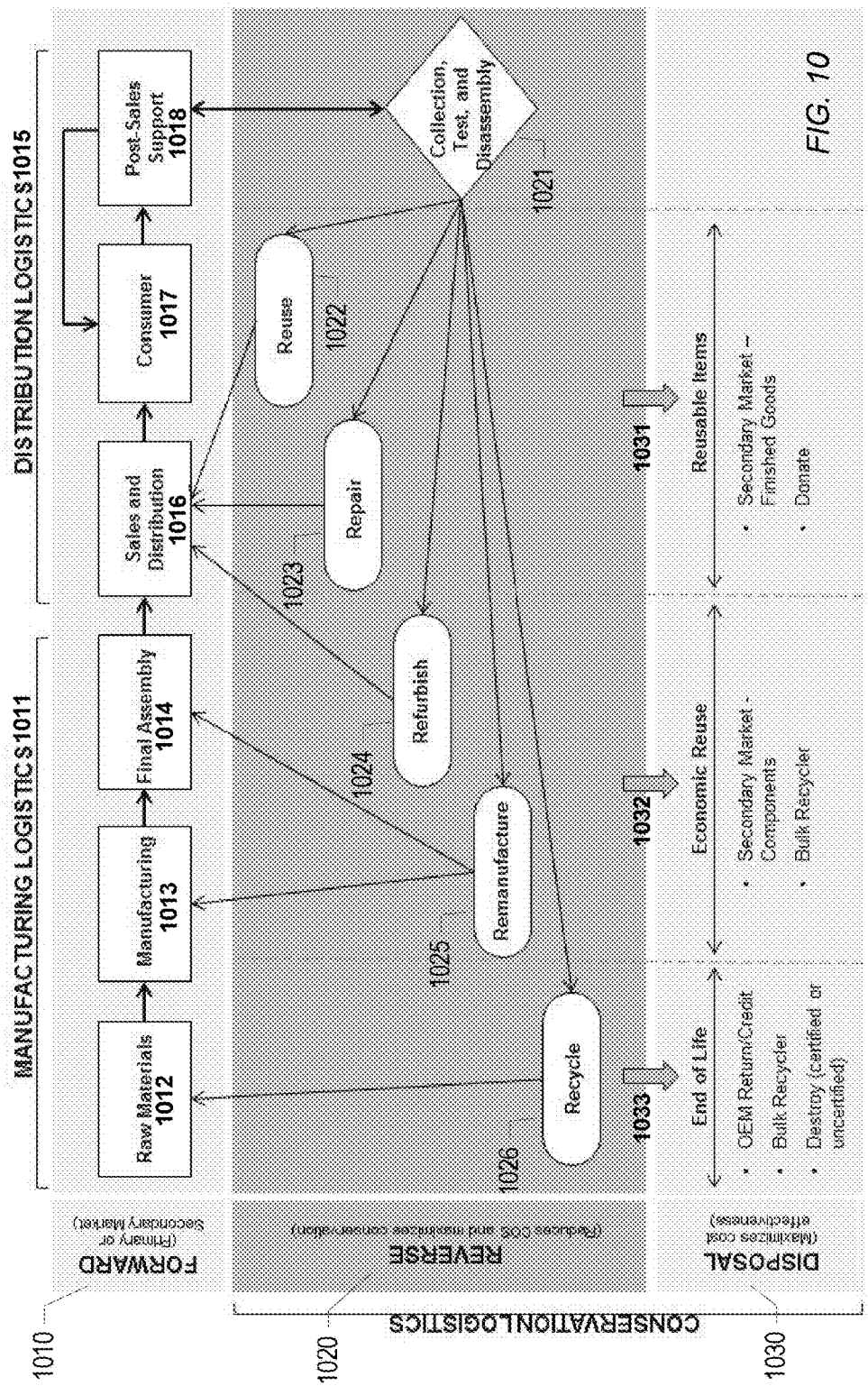
Figure 11:
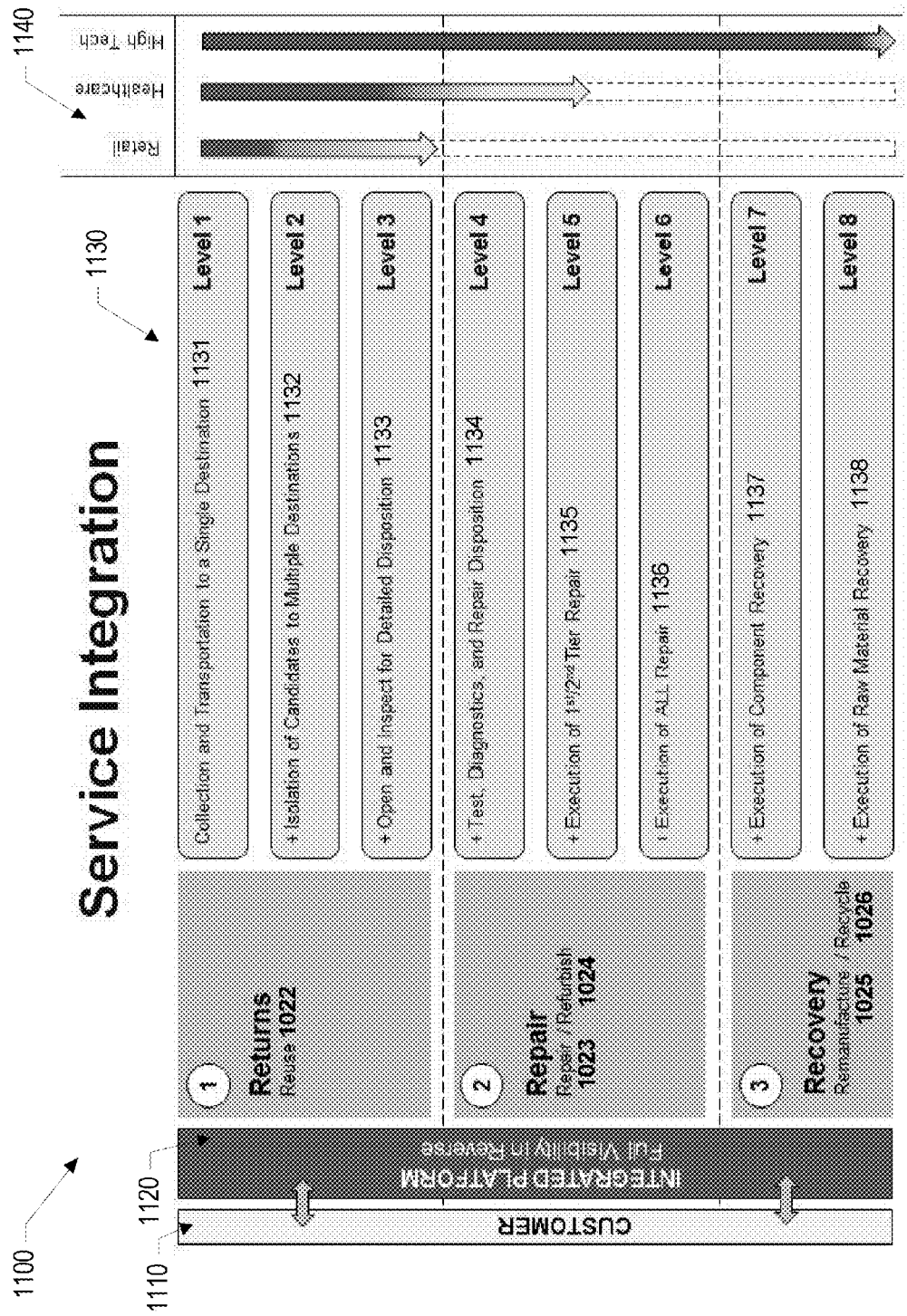
Figure 12:
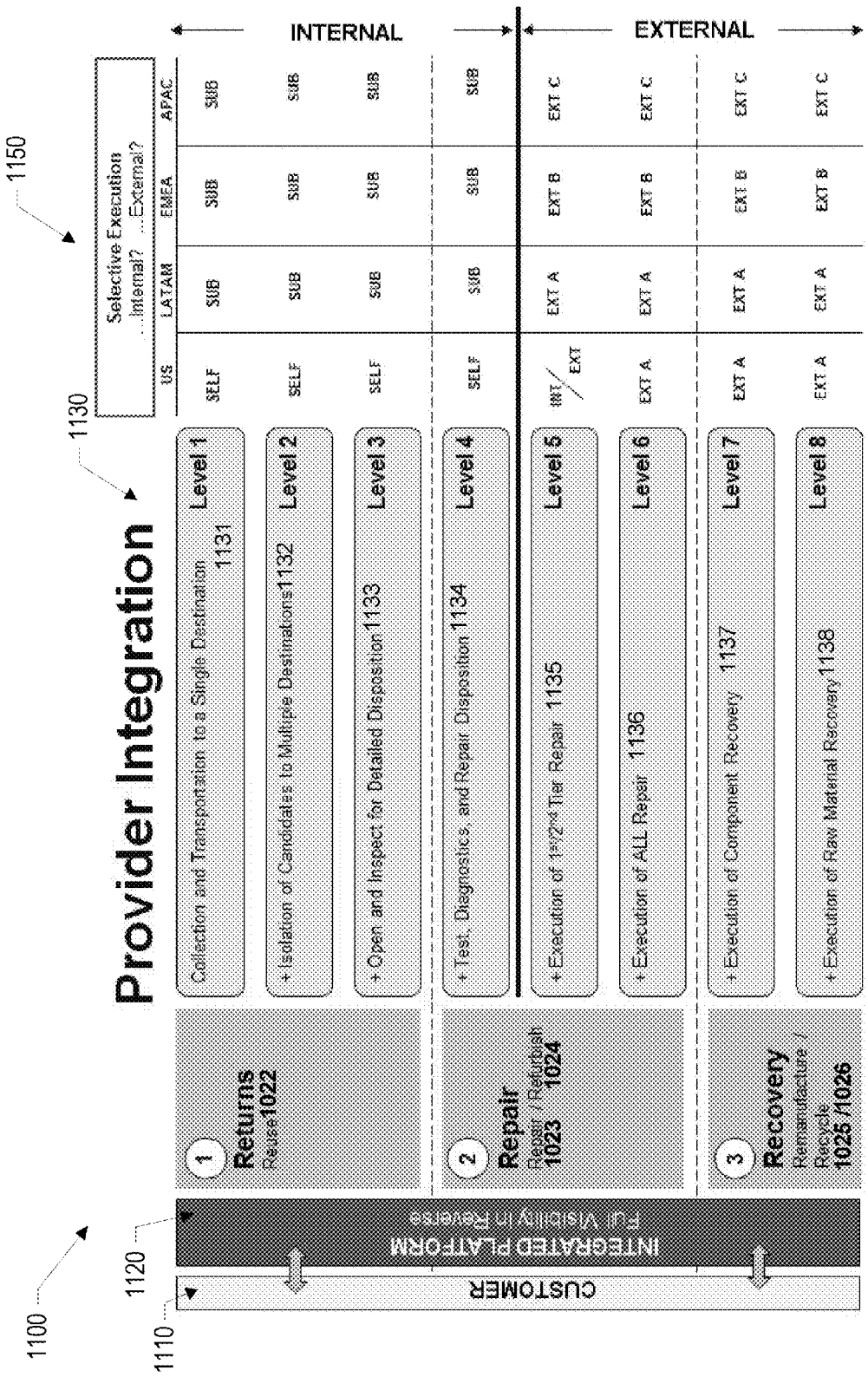
Figure 13:
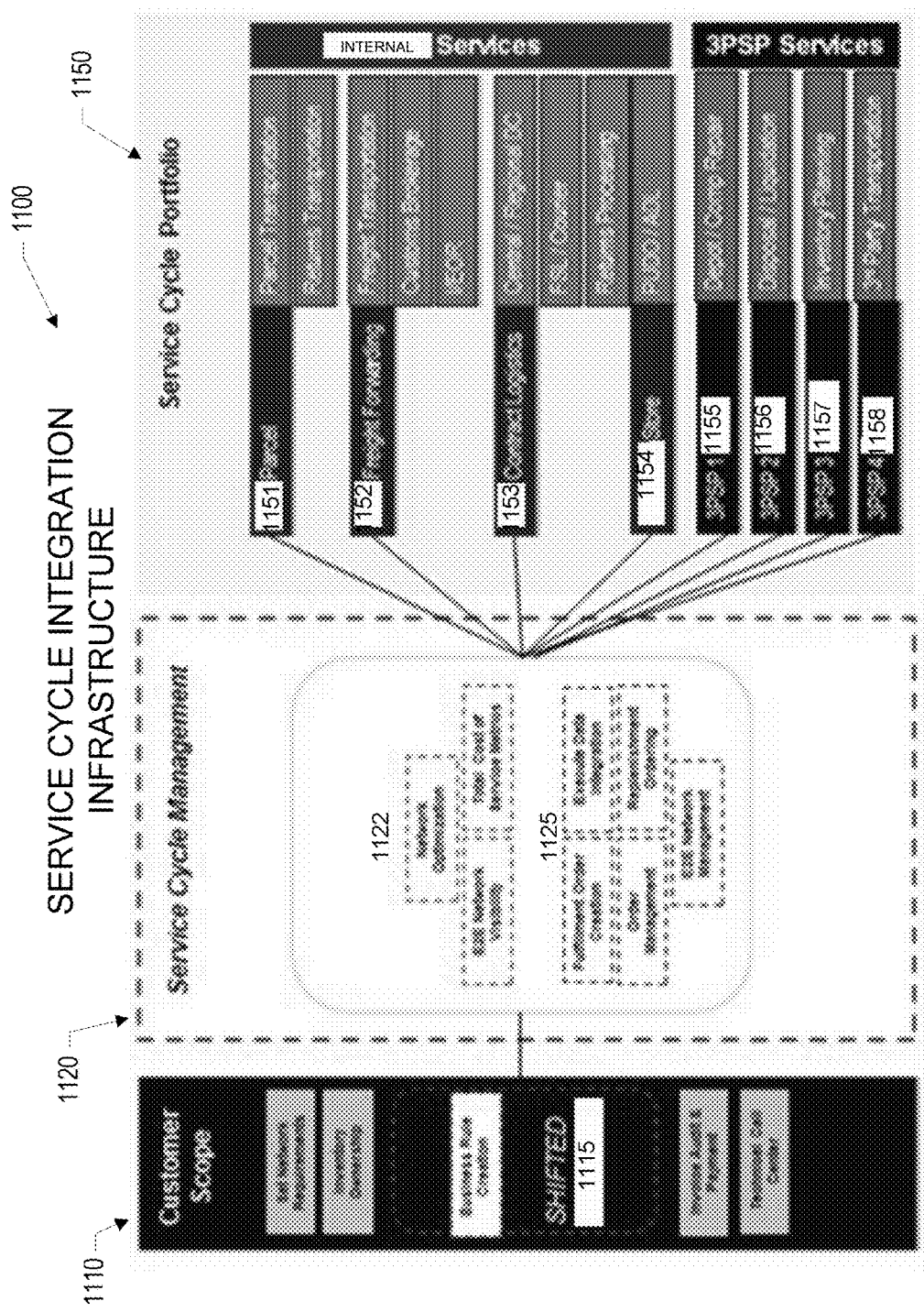
Figure 14:
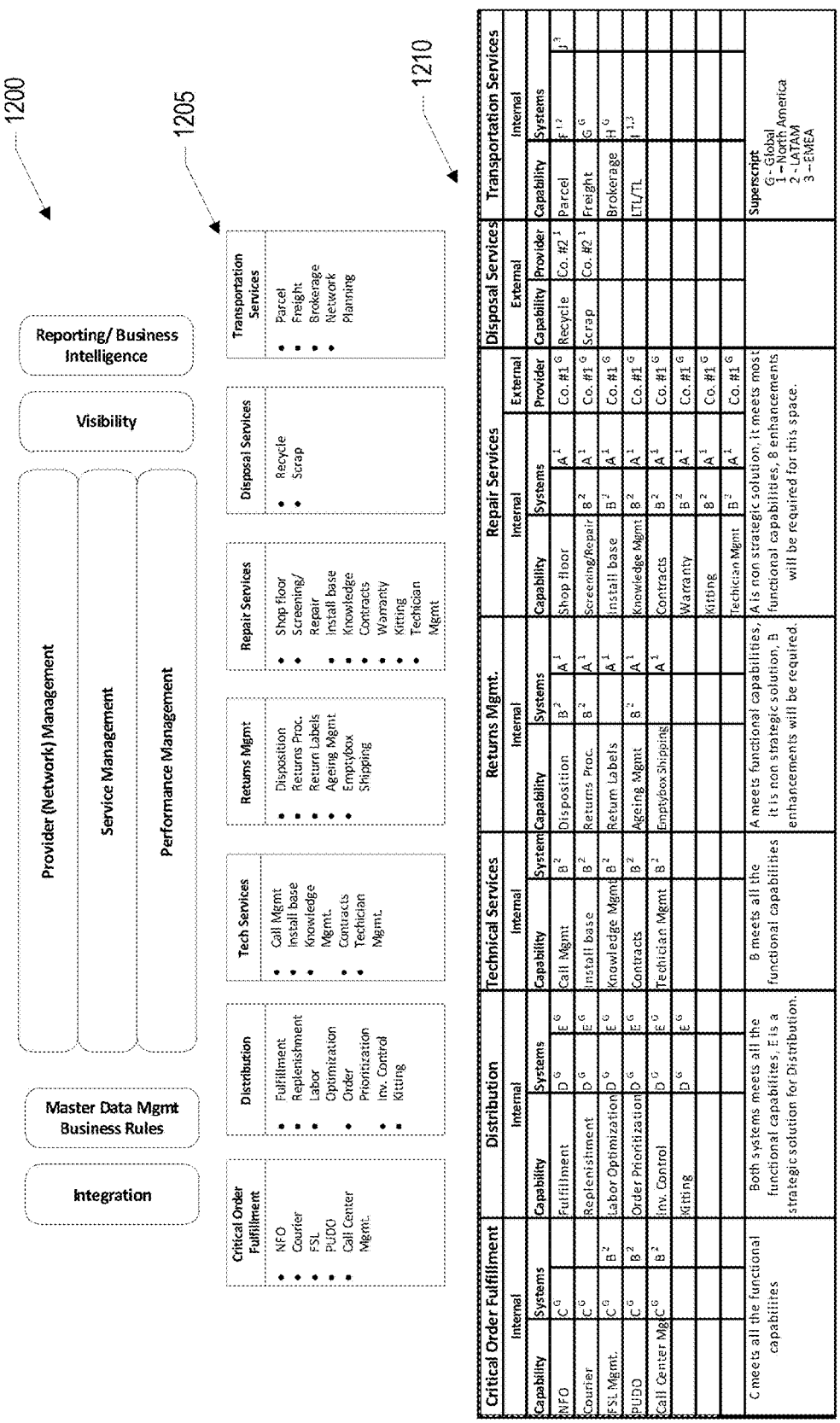
Figures 15A, 15B, 15C:
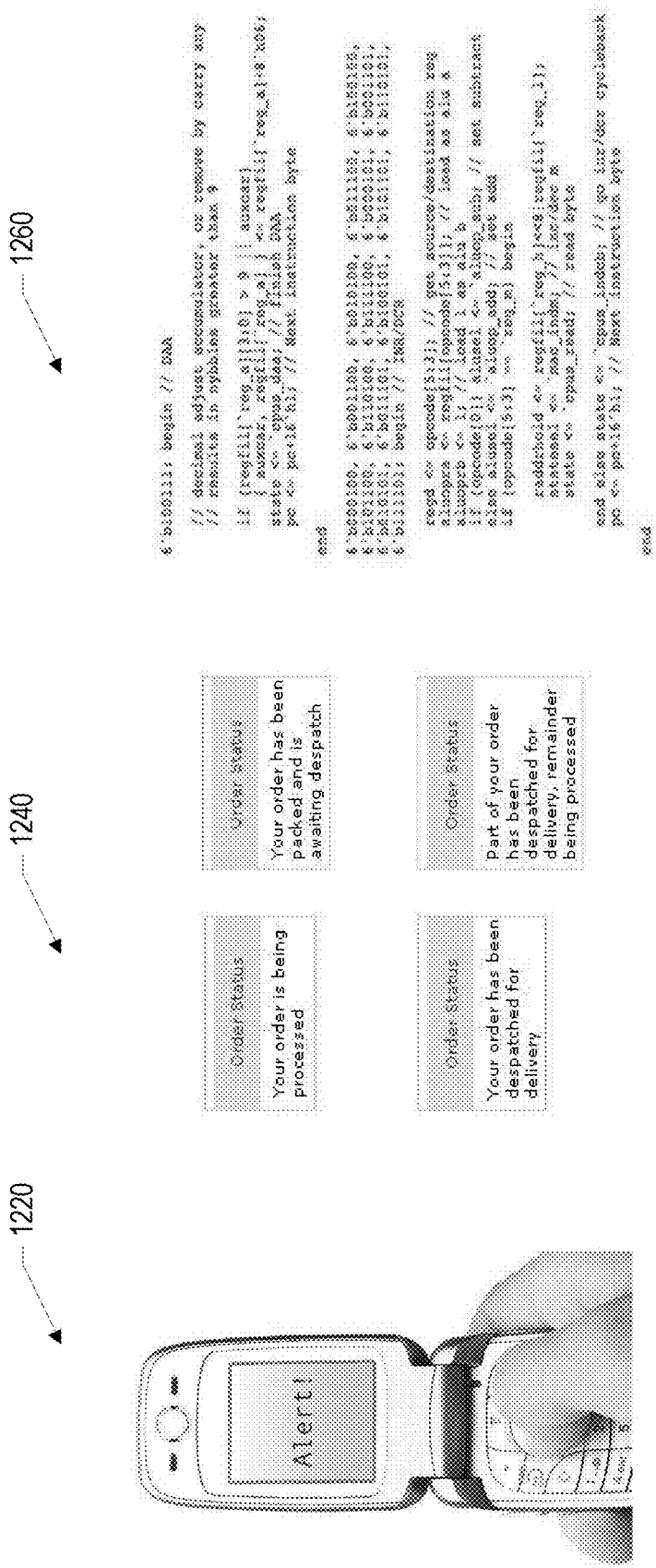
Figure 16:
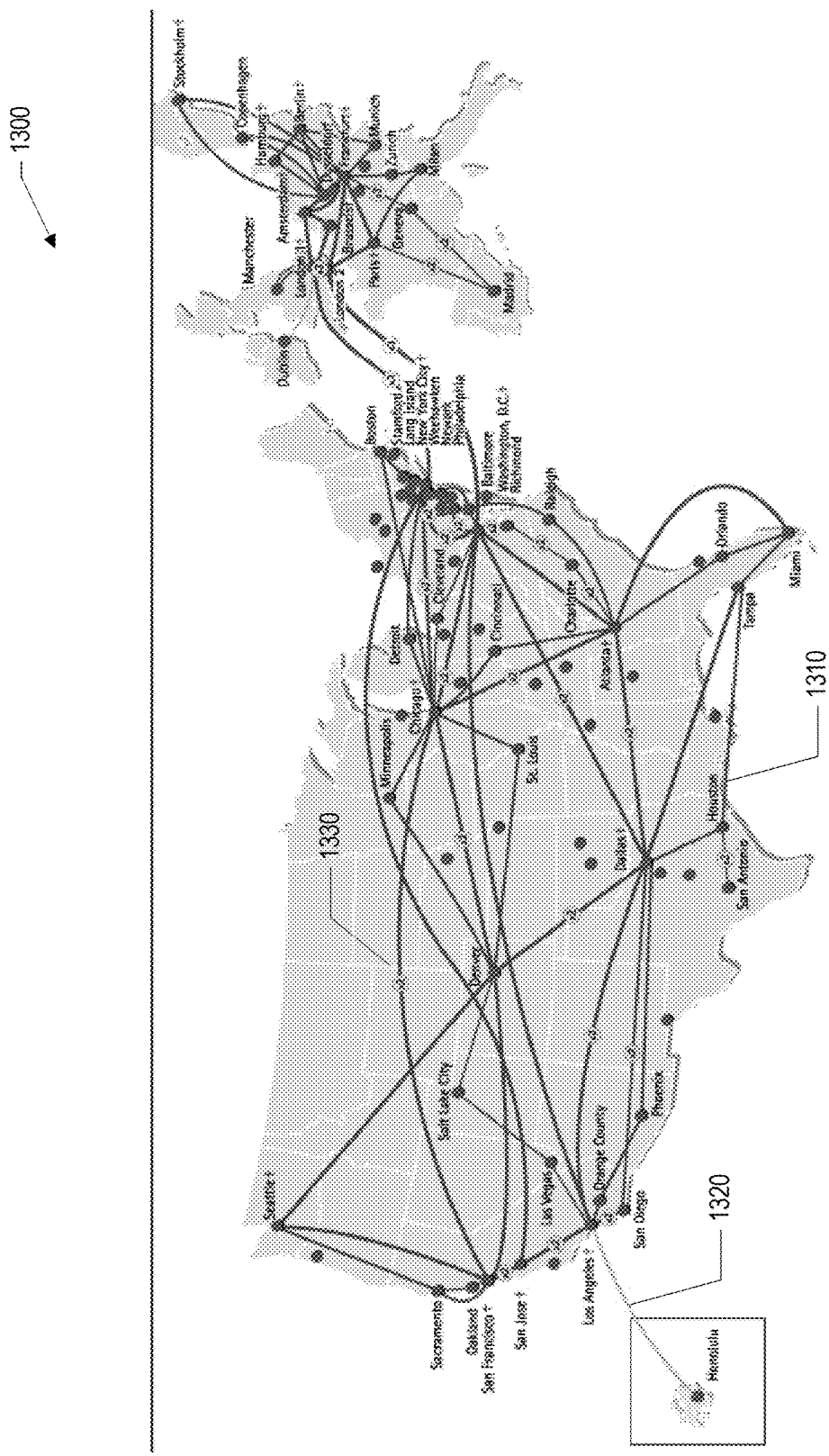
Figure 17:
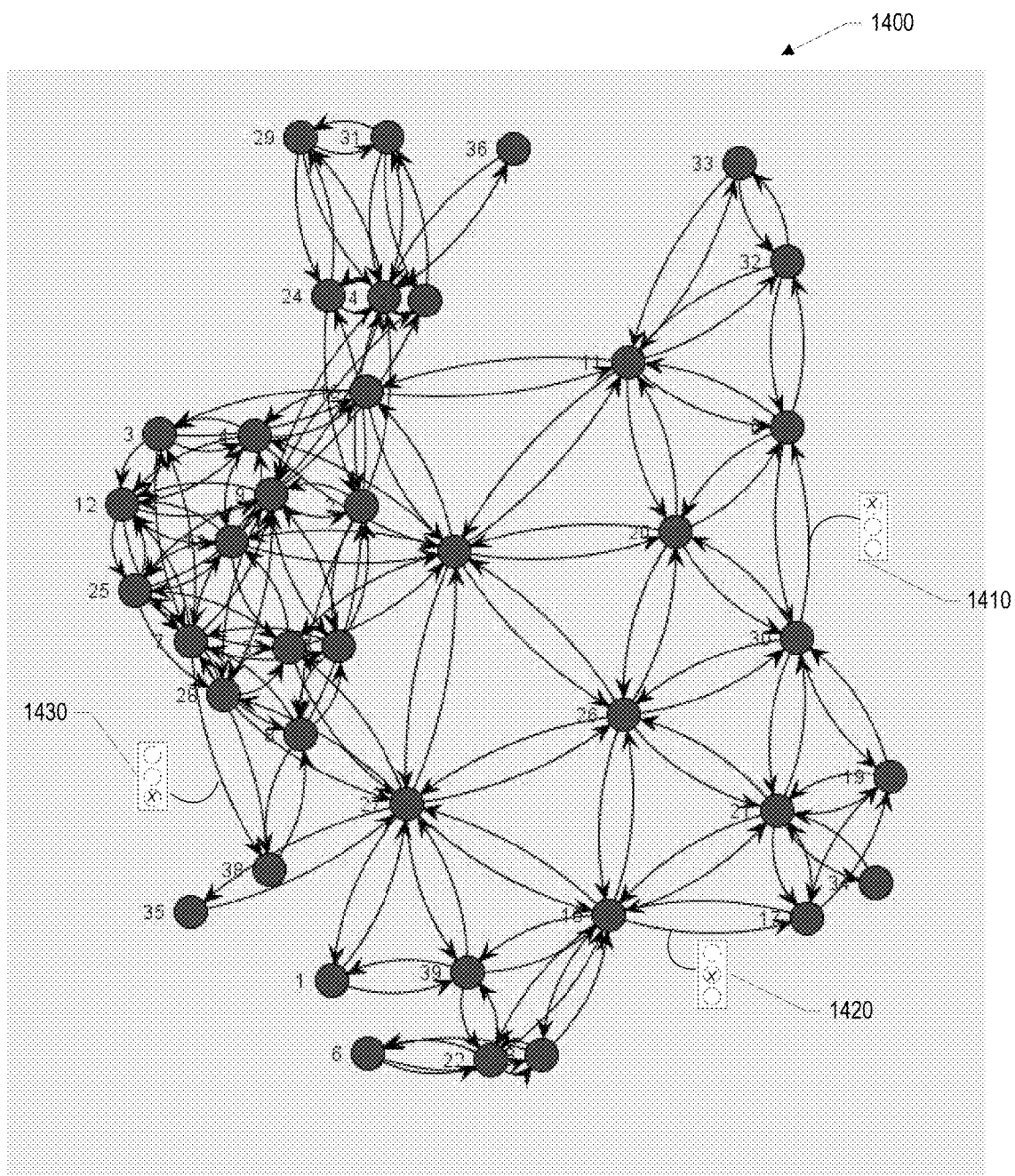

FIG. 5 is a schematic block diagram of a data module 400, an analysis module 500, a report/execution module 600, and an intelligent visibility module 700, all as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the analysis module 500 shown in FIGS. 2 and 5;

FIG. 8 illustrates an exemplary process flow according to various embodiments for the report/execution module 600 shown in FIGS. 2 and 5;

FIG. 9 illustrates an exemplary process flow according to various embodiments for the intelligent visibility module 700 shown in FIGS. 2 and 5;

FIG. 10 is a schematic block diagram of an exemplary service cycle supply chain network 1000, in the context of which various embodiments of the outcome-based service cycle management system 20 of FIG. 1 are implemented;

FIG. 11 is an illustration of an integrated platform 1120 within a service cycle integration infrastructure 1100, via which various embodiments of the outcome-based service cycle management system 20 of FIG. 1 are implemented;

FIG. 12 is an illustration of the integrated platform 1120 and the service cycle integration infrastructure 1100 of FIG. 12, further illustrating a matrix 1150 of selectively integrated internal and external service provider entities;

FIG. 13 is an illustration of the service cycle integration infrastructure 1100 of FIG. 12, further illustrating discrete elements thereof (e.g., 1112, 1125), as consolidated within the integrated platform 1120 for purposes of service cycle management according to various embodiments;

FIG. 14 is an illustration of another exemplary service cycle integration infrastructure 1200, wherein additional sub-level details of service and provider parameters are illustrated, with reference to tables 1205 and 1210;

FIGS. 15A-C are exemplary alerts, reports, and instructions, as may be generated by the report/execution module 700 of the system 20 according to various embodiments;

FIG. 16 is an exemplary service cycle integration intelligent visibility display 1200, as may be generated via various embodiments of the system 20 according to various embodiments, upon execution of at least the intelligent visibility module 700 of FIGS. 2, 5, and 9; and FIG. 17 is an additional exemplary service cycle integration intelligent visibility display 1200, as may be generated via various embodiments of the system 20 according to various embodiments, upon execution of at least the intelligent visibility module 700 of FIGS. 2, 5, and 9.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to provide outcome-based management of service cycle infrastructures. To achieve these results, the systems and methods described herein centralize decision making processes so as to create an efficient and effective service cycle, particularly in the context of reverse cycle management, which continually assesses options so as to ensure that customer-driven outcomes are not only achieved, but maximized. The systems and methods do so by implementing an integrated platform that consolidates not only the reverse service cycle pathways but also a plurality of internally and/or externally (e.g., relative to the system host) located providers uniquely positioned to facilitate efficient and effective cycle flow. In this manner, the systems and methods described herein provide a single source solution for management of the service cycle process and in so doing transition a significant portion of the decision-making process to the integrated host. Various embodiments of the systems and methods described herein further provide a simulation tool that interactively models actual data against performance metrics so as to identify potential areas for improvement for users thereof. Additional details in this regard and otherwise, will be provided elsewhere herein.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture

FIG. 1 is a block diagram of an outcome-based service cycle management system 20 that can be used in conjunction with various embodiments of the present invention. In at least the illustrated embodiment, the outcome-based service cycle management system 20 may include one or more distributed computing devices 100, one or more distributed handheld devices 110, and one or more central computing devices 120, each configured in communication with a service cycle management server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 20 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the service cycle management server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the service cycle management server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In certain embodiments, one or more of the distributed computing devices 100 and the distributed handheld devices 110 may be associated with one or more independent third party users, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Service Cycle Management Server 200

In various embodiments, the service cycle management server 200 includes various systems for performing one or more functions in accordance with various embodiments of the present invention, including those more particularly shown and described herein. It should be understood, however, that the service cycle management server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

FIG. 2 is a schematic diagram of the service cycle management server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200.

In addition, the service cycle management server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the service cycle management server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, an analysis module 500, a report/execution module 600, and an intelligent visibility module 700. In these and other embodiments, the various modules 400, 500, 600, 700 control certain aspects of the operation of the service cycle management server 200 with the assistance of the processor 230 and operating system 280. In still other embodiments, it should be understood that one or more additional and/or alternative modules may also be provided, without departing from the scope and nature of the present invention.

In general, as will be described in further detail below, the data module 400 is configured to receive, store, manage, and transmit various components of input data 410, as may be received and/or acquired from a plurality of sources. In this manner, it should be understood that the data module 400 provides a mechanism via which a plurality of data that has been historically distributed across multiple sources is consolidated for management and analysis (see FIG. 5). According to various embodiments, the data module 400 is configured to provide any combination of the above-described input data 410 to one or more of the analysis module 500 and the report/execution module 600, whether proactively or upon request therefor. In certain embodiments, at least a portion of the input data 410 may be additionally and/or alternatively separately provided to the intelligent visibility module 700, as will also be described in further detail below.

Upon receipt and/or retrieval of any portion of the above-described input data 410, the analysis module 500 is configured to activate a service selection tool 510 (see FIG. 5). The service selection tool 510 is configured to select an optimal service for an item or asset entering the reverse cycle 1020 of the service cycle supply chain 1000, all as illustrated in at least FIG. 10 and described in further detail below. It should be understood that the service selection tool 510 is configured to analyze a plurality of parameters when assessing the reverse cycle 1020, including the non-limiting examples of customer-defined outcomes and/or preferences, yield metrics associated with various available selections, particularly as related to reentry into the forward supply chain process, and external considerations such as the non-limiting examples of conservational neutrality and the like, all as will be described in further detail below. The service selection tool 510, as configured according to various embodiments, outputs service selection data 515 based at least in part upon its performed analyses.

Upon generation of the service selection data 515, various embodiments of the analysis module 500 further execute a provider selection tool 520 (see FIG. 5). The provider selection tool 520 is configured generally to determine an optimal provider or providers for performance of the service selected by tool 510 and identified in data 515. Non-limiting examples of providers include a common carrier for transport of and basic repair of the item (see FIG. 12) and one or more external third party service providers (3PSP) for complete refurbishment, remanufacture, and/or recycling of the item (see FIG. 12 again). Like the analysis surrounding execution of the service selection tool 510, execution of the provider selection tool 520, along with the types and content of data accumulated and assessed thereby, will be described in much further detail elsewhere herein.

The report/execution module 600 according to various embodiments is configured to receive or otherwise acquire at least some portion of the service selection data 515 and/or the provider selection data 525 and use the same as input to an execution tool 610. Upon receipt and/or acquisition, the report/execution module 600 is configured to perform one or more tasks. Non-limiting examples include generating one or more reports 612, which may detail the selections of the analysis module 500, as described above; generating one or more alerts 614, which may similarly notify one or more users of the system of the same; and generation of one or more instructions 616, which may be configured to facilitate execution (e.g., implementation) of the selections identified. In other words, the report/execution module 600 is, according to various embodiments, generally configured to communicate the conclusions drawn by the analysis module 500 so as to ensure users, namely those customers seeking to place one or more items and/or assets into the reverse cycle supply chain flow, are able to do so in an effective, efficient, and streamlined manner.

The intelligent visibility module 700, as will be described in further detail elsewhere herein, is configured according to various embodiments to provide a simulation-based analytics tool that provides an improved degree of transparency to the handling and management processes associated with movement of items and assets through a service cycle, particularly in the context of a reverse service cycle. The module 700 provides at web-based tool on interactive operations research that presents a simplified network representation including various pieces of input data 410, and models the same for purposes of management of efficiencies and/or discrepancies. In certain embodiments, various weights and parameters are analyzed so as to identify areas wherein customers and/or users of the system should focus future initiatives for improvement.

In various embodiments, the program modules 400, 500, 600, 700 are executed by the service cycle management server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. In other embodiments, one or more of the modules 400, 500, 600, 700 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600, 700 may send data to, receive data from, and utilize data contained in, one or more databases, which may be comprised of one or more separate, linked and/or networked databases.

Also located within the service cycle management server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the service cycle management server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

While reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

Service Cycle Supply Chain Network 1000 and Associated Infrastructure

According to various embodiments, the outcome-based service cycle management system 20 and the service cycle management server 200 described elsewhere herein are configured to be utilized within a service cycle supply chain network 1000 such as that illustrated in FIG. 10. Generally speaking, service cycle management is a technology and business process, whereby various assets and commodity items are manufactured and distributed to the consumer market. During the forward cycle 1010, a manufacturing logistics process 1011 begins with raw materials 1012 (e.g., component level parts and the like), which are manufactured 1013 by one or more entities for final assembly 1014. Upon final assembly, the assets and/or commodity items enter a distribution logistics process 1015, whereby sales 1016 occur to transfer the assets and/or commodity items to one or more consumers 1017 (also referred to elsewhere herein as customers), who then typically requires, via agreement or otherwise, certain post-sales support 1018.

At some point during the post-sales support 1018 life cycle, a consumer and/or customer may request collection, test, and/or disassembly 1021 of the asset or commodity item. According to various embodiments, when such occurs, the asset or commodity item enters what is commonly referred to as the reverse service cycle flow 1020. During the reverse cycle, which may be initiated by end of life, breakdown, or otherwise lack of consumer desire for the asset or commodity item, a plurality of decisions are made regarding possible recapture of any remaining value within the asset or commodity item. As FIG. 10 illustrates, a serial progression of options exist, ranging from minimal complexity options (e.g., reuse 1022 and repair 1023) that may only involve cleanup of the asset or commodity item or at most repair of minor parts, to higher complexity options (e.g., refurbish 1024, remanufacture 1025, and/or recycle 1026), whereby the asset or commodity item may be entirely rebuilt and/or substantially disassembled for future sale of components and/or scrap materials. As should be generally understood, as may be seen also in FIG. 11, the optimal option is oftentimes at least in part dependent upon the nature of the asset or commodity items and/or the market in which it exists (e.g., see the non-limiting examples of retail materials, healthcare machines, and high tech items such as laptop computers 1140).

Returning to FIG. 10, under traditional (e.g., conventional) service cycle supply chain management processes, decisions regarding the recapture of any remaining value in an asset or commodity item were predetermined far in advance of occurrence of the post-sales support 1018 triggering event. Oftentimes, such creates inefficiencies and/or ineffective handling of the asset or commodity item. As such, various embodiments of the present invention are configured to not only provide an integrated infrastructure (as will be described later herein), but to also consolidate the decision-making process with a single service cycle management system, which can in a near-real time fashion assess the optimal reverse cycle option for the particular asset or commodity item, simultaneously looking both to the left (e.g., toward disposal options 1030, which may include end of life disposition 1033, economic reuse in a secondary market 1032, and/or reuse or donation 1031) and to the right (e.g., toward the forward loop reentry options 1010 (e.g., as previously described), whereby remaining asset or commodity item value may be recaptured). The manner in which various embodiments of the outcome-based service cycle management system 20 achieves the optimal management, which is based at least in part upon customer-desired outcomes (e.g., yield, return, etc.), will be described in further detail below in the context of at least the analysis module 500.

Remaining momentarily with FIG. 10, a non-limiting example is useful to illustrate the process described above, which example will be referred to elsewhere herein for explanatory purposes, consider a customer as a purchaser of one or more magnetic resonance imaging (MRI) machines may, upon purchase thereof, enter into a warranty and/or service agreement, whereby preventative service and replacement of the machines may be provided by a supplier thereof. Under traditional service and/or replacement models, a technician for the MRI machine may inspect the machine periodically and, for example, upon breakdown, request a replacement part. Alternatively, the machine may be scheduled for transport for off-site repair and/or for whole replacement, for example in the instance of breakage of a critical component. In either scenario, once post-sales support 1018 (see again FIG. 10) is initiated, the MRI machine enters the reverse loop service cycle 1020, which is managed according to various embodiments of the outcome-based service cycle management system 20 of the present invention in the manner, as will be described elsewhere herein.

For purposes of illustration, however, where the MRI has broken down, various embodiments of the system 20 are configured to dynamically assess the options (1022-1026) so as to determine the optimal route, based at least in part upon pre-established customer-defined outcomes, all as will be described in further detail elsewhere herein. For example, if the customer wants to maximize the life cycle of the MRI machine, the system 20 may determine that repair 1023 of the part may be optimal and thus coordinate internally transport and installation of the replacement part, as necessary. Alternatively, if the customer has defined a desire to wholly replace any machines upon breakage of part "X," then the system 20 is configured according to various embodiments to at least initially coordinate collection, test, and/or disassembly 1021 of the MRI machine. In certain embodiments, the system 20 may be configured such that the system provider not only coordinates but also performs the tasks necessary for collection, text, and/or disassembly. In other embodiments, the system provider may further coordinate and/or perform the tasks necessary for providing a replacement/rental asset or commodity item, where collection involves removing the asset or commodity items from its typical location, whether such is intended to be temporary or permanent in nature.

Remaining with the non-limiting example of the MRI machine, as may be also understood from FIG. 10, upon collection, test, and/or disassembly 1021, various embodiments of the system 20 are configured to determine the optimal processing route for the MRI machine. If part "X" is one or more gradient coils adjacent the magnet, in view of a customer's desire to maximize, for example, yielded revenue for disposition of the MRI machine, various embodiments of the system 20 are configured to assess how such is achieved, whether by refurbishment 1024, followed by (re)sale 1016 in a direct market in the forward loop 1010 or in a secondary market via economic reuse 1032, thus illustrating the "look left; look right" logic employed by the system, as will be described in further detail below in the context of at least the analysis module 500. With reference to the non-limiting example of the MRI machine, the system 20 may determine that refurbishment 1024 followed by a direct resale 1016 to another forward cycle loop 1010 customer may maximize yield for the customer, as compared to alternative options, such as component sales via the disposal loop 1030. It should be understood that the system 20 is configured to not only apply general business rules in this process, but also to account for one or more customer-defined parameters, so as to provide a customer "outcome-based" service cycle management infrastructure.

With reference now to FIGS. 11 and 12, as previously mentioned herein, various options for moving an asset or commodity item through the reverse cycle loop 1020 (see FIG. 10) are further broken down, detailing one or more activities 1130 that may be commonly associated therewith. As illustrated in FIG. 11, the activities 1130 may be categorized (e.g., as Level 1-8, in the non-limiting illustration of the figure) for not only easy reference, but also association with one or more particular providers capable of handling such activities (see FIG. 12 specifically). For example, collection and transportation to a single destination 1131, isolation of candidates to multiple destinations 1132, and opening and inspecting items for disposition 1133 may be handled internally by the provider of the system 20, as described elsewhere herein, as such is an across the board service, applicable to multiple markets 1140 regardless of complexity. As a non-limiting example, a customer may return a particular carton of retail clothing for any particular reason and the provider of the system 20 may be, in certain embodiments, configured to internally process the same for return and reuse 1022, providing not only transport of the retail clothing, but opening and inspection of the same.

Remaining with FIGS. 11 and 12, it should be understood generally that as the complexity of the mitigation of the returned or otherwise broken asset or commodity item increases, the provider of the system 20 may configure various embodiments of the integrated system such that certain activities (e.g., whole repair 1136, component recovery 1137, and/or raw material recovery 1138) are performed by external service providers. Of course, in certain embodiments, agreements may be pre-determined with such service providers so as to further facilitate the efficiency and effectiveness of the integrated system 20 as a whole. Still further, with particular reference to FIG. 12, it may be also understood that certain activities may be deferred to internal subsidiaries (e.g., test, diagnostics, and repair 1134), while other activities may be split internally and externally (e.g., $1^{st}$ and $2^{nd}$ tier, or otherwise partial, repair 1135), as may be desirable for particular scenarios.

Generally speaking, however, it should be understood from FIGS. 10-12 that various embodiments of the system 20 described throughout herein are configured to provide an integrated platform 1120 that is managed by a single provider, so as to create a single-source interface between customers 1110 and the services and providers thereof involved with the reverse service cycle loop 1020 (see FIG. 10). So as to maximize efficiency and effectiveness, as determined at least in part based upon customer established criteria, various embodiments are configured to analyze a variety of outcome-based parameters and associated data to determine an optimal route for reverse movement and recapture of any remaining value (e.g., yield) of the asset or commodity item, and to ultimately assign provider responsibility 1150 (see FIG. 12) either internally or externally for the execution of the activities and/or steps necessary to implement the identified optimal route. The logical processes surrounding this analysis and implementation will be described in further detail below.

Turning momentarily, however, to FIG. 13, an additional feature of various embodiments of the outcome-based service cycle management system 20, which has been only previously alluded to herein, is illustrated. In particular, in certain embodiments, the service cycle management 1120 responsibilities are consolidated with a single system provider, so as to minimize burden on customer scope 1110 and end service providers of the service cycle portfolio 1150. In other words, numerous agreements, relationships, and communications, across multiple pathways are all directed through and managed internally to a centralized infrastructure (see also FIGS. 11-12 and 14, integrated platform 1120 and integrated infrastructure 1200). In this manner, not only are communications and processes streamlined and simplified, but the customer 1110 and third party service providers downstream are all provided with full end-to-end visibility throughout the reverse service cycle loop 1020 (see FIG. 10), thereby greatly enhancing the efficiency and effectiveness thereof in a near real-time fashion. Additional details in this regard will also be provided further below.

A still further feature of various embodiments of the outcome-based service cycle management system 20 may be understood with reference to FIGS. 16 and 17, namely the provision of an intelligent visibility service that provides an additional analytics tool that moves the transparency provided for multi-provider reverse networks from descriptive to prescriptive. As may be understood from FIGS. 16 and 17, exemplary displays 1300, 1400 may be provided via a customer/user interface associated with the system 20, whether online or otherwise. The displays 1300, 1400 are generally configured to provide a simplified network representation that uses system provider data (e.g., tracking, network management, and the like) and customer business rules to illustrate at least end to end multi-provider network performance, bottlenecking or under-performing areas, suggested areas of improvement or optimization focus, and drill-down opportunities to refine focus. In this manner, the intelligent visibility service can provide a network simulation for managing service cycle operations, versus predicting the same. In certain embodiments, the intelligent visibility data may be overlaid upon actual track and trace data so as to identify discrepancies, bottlenecks, and/or under-performance. In FIG. 15, it may be seen that the intelligent visibility data may be further overlaid upon a geographical map indicative of physical locations of various nodes (e.g., parties, systems, facilities) integrated within system 20. Different lines between successive nodes may be identified as optimal 1330 (e.g., perhaps green coded), in need of improvement 1320 (e.g., perhaps yellow coded), and creating issues 1310 (e.g., perhaps red coded). FIG. 14 illustrates an alternative display according to various embodiments, where performance between network nodes may be rated on a "traffic light" scale, as red 1410, yellow 1420, or green 1430. All of these and still further features of the intelligent visibility service will be described in further detail elsewhere herein.

Service Cycle Management Server 200 Logic Flow

Reference is now made to FIGS. 3-9, which illustrate various logical process flows executed by various embodiments of the modules described previously herein. In particular, FIG. 3 illustrates the overall relationship of the modules 400, 500, 600, 700 of the service cycle management server 200, according to various embodiments. As illustrated, operation of the system 20 via the server 200 begins, according to various embodiments, with the execution of the data module 400, which receives, stores, manages, and transmits a variety of input data 410 (see FIG. 5). At least portions of the input data 410 are provided, as desirable, to the analysis module 500, as will be described in further detail below. The analysis module 500 is generally configured according to various embodiments to execute one or more tools to identify an optional reverse cycle loop 1020 (see FIG. 10) service route for one or more assets or commodity items under scrutiny by the system 20, both with respect to the particular service activity 1130 (see FIG. 11) and the particular service provider entity 1150 (see FIG. 12) therefor, all as will be described in further detail below.

Once identified, generated data along with portions of the input data 410 (see FIG. 5) are provided according to various embodiments to the report/execution module 600, which is configured to generate one or more instructions (e.g., for implementation of the identified solution for reverse cycle flow), reports, notifications, and/or alerts, however as may be desirable in various scenarios. In parallel and/or in a manner additional to that described for data flow between the modules 400, 500, 600, various embodiments of the system 20 via the server 200 include an intelligent visibility module 700, which is configured to analyze implementation of a plurality of reverse cycle loop decisions (as previously described in the context of the analysis module 500) against customer-defined parameters and/or desired outcomes, so as to gauge the effectiveness and efficiency of the system with respect to satisfying the same. In certain embodiments, the intelligent visibility module 700, by simulating actual versus desired data points, is configured to facilitate future initiative planning by customers (e.g., users of the system), particularly to identify areas of focus that might not otherwise be recognizable, all as will be likewise described in further detail below.

Specifically, detailed steps performed by various embodiments of the data module 400 are described in relation to FIG. 6; steps performed by various embodiments of the analysis module 500 are described in relation to FIG. 7; steps performed by various embodiments of the report/execution module 600 are described in relation to FIG. 8; and steps performed by various embodiments of the intelligent visibility module 700 are described in relation to FIG. 9.

Figure 4:
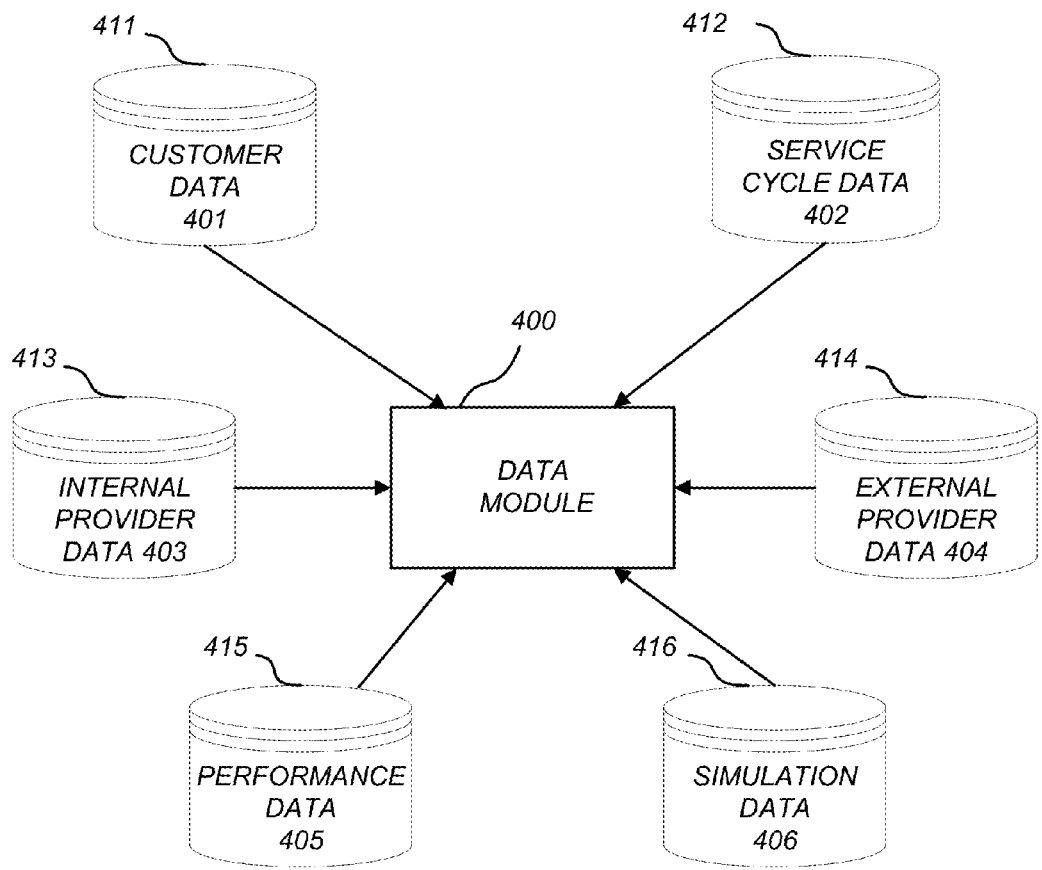
FIG. 4 illustrates a schematic diagram of various databases that are utilized by the outcome-based service cycle management system 20 shown in FIG. 1 according to various embodiments.

With reference now to FIG. 4, such illustrates a block diagram of various exemplary databases via which the data module 400 manages a variety of input data 410 (see also FIG. 5). In particular, in at least the embodiment shown in FIG. 4, the following databases are provided: a customer data database 411, a service cycle data database 412, an internal provider data database 413, an external provider data database 414, a performance data database 415, and a simulation data database 416. Although the embodiment of FIG. 4 shows these databases 411, 412, 413, 414, 415, and 416 as being separate databases each associated with different types of data, in various other embodiments, some or all of the data may be stored in the same database. In still other embodiments, additional and/or alternative databases may be provided, as may also be desirable for particular applications.

According to various embodiments, the customer data database 411 may be configured to store and maintain a variety of customer data 401. In certain embodiments, the customer data 401 may comprise information concerning one or more customers who use the system 20 associated with the data module 400. Non-limiting examples include desired outcome parameters (e.g., service inside of 48 hours, 99% of the time, at least 5% yield at all times), service cycle data (e.g., preference for or weighting of donation of used assets versus introduction into secondary retail markets), asset or commodity item inventory supply and demand data, operations data, preventative maintenance schedule data, customer requests/orders for reverse cycle loop support, replenishment order data, service order data, and general administrative data such as name, address, and billing information. It should be understood that according to various embodiments, a variety of details regarding these and still other types of customer-owned, customer-defined, and/or customer-generated data may be stored within the customer data database 411. Non-limiting examples of such details may include in-depth descriptions particular weights or rankings placed upon each of the reverse cycle loop options that may be available (see FIG. 10) dependent upon a particular customer's business model, and historical data regarding preventative maintenance activities, including prior chosen reverse cycle loop options under certain circumstances, the frequency thereof, and/or the efficiency in mitigating the same.

As mentioned, the customer data 401 may include one or more customer requests/orders for reverse cycle loop support. In certain embodiments, such may be for reverse cycle loop disposition of an asset or commodity item; in other embodiments, such may be for replenishment orders, as may be deemed necessary based on target inventory levels, as will be described in further detail elsewhere herein. In still other embodiments, it should be understood that the replenishment data may be configured such that replenishment orders may be automatically generated by the system 20, in accordance at least in part with customer-defined outcome parameters. In that context, with reference to the ongoing MRI machine example, the customer data 401 may include a copy of a repair request that may be initiated by a particular customer upon breakdown of the machine. Other non-limiting examples would be a request for physical return of an asset (e.g., the MRI machine) for repair, or a request for return of one or more retail articles of clothing from a retailer-based customer. In any of these non-limiting examples, it should be understood that the customer data 401 may be received from a variety of sources, but upon receipt of at least a portion thereof, typically a new inquiry or order or request, the system 20 is configured according to various embodiments to invoke the analysis module 500 for further processing thereof, as will be described in further detail elsewhere herein.

It should further be understood that the customer data 401 within the database 411 may be received not only from the one or more customers themselves, but from a variety of sources, either external or internal to the customer, as may be appropriate given particular applications. For example, in certain embodiments, at least a portion of the customer data 401 may be based at least in part upon third party regulations that may govern certain classifications of assets and/or customers using the same. For example, regulations may exist that prevent refurbishment and resale of magnetic components of MRI machines across international borders, thereby restricting options for the reverse cycle loop analysis subsequently performed by the analysis module 500 of the system 20. Such externally imposed regulations may, according to certain embodiments, be captured within at least the customer data 401, although in other embodiments, regulatory service cycle data may be maintained in one or more separate and distinct databases, as may be preferable for certain applications.

In any event, in all of these and still other embodiments, it should be understood that, upon receipt of at least some portion of customer data 401, the customer data database 411 will store any newly received data in a manner associated with at least the data module 400 and for provision (whether automatically, manually, or at a later time) to one or more of the modules 500-700, as will also be described in further detail below. In certain embodiments, updated customer data 401 will overwrite previously existing data, for example, where regulatory parameters or administrative address details have been changed; in other embodiments, however, updated data may be stored in a manner complementary of pre-existing data 410, for example where customer-desired outcomes are modified with additional parameters. Of course, in any of these and still other embodiments, a variety of alternative configurations could exist, as commonly known and understood in the art.

According to various embodiments, the service cycle database 412 may be configured to store and maintain service cycle data 402 associated with various aspects of the service cycle process, as may be seen in at least FIG. 10-11. Such may be received and populated, for example, via any of a number of sources, as may be accessing and/or using the system 20. Non-limiting examples of service cycle data 402 include not only the types of reverse cycle options (e.g., 1022-1026) that may be available for redirecting a collected, tested, and/or disassembled asset or commodity item (see also FIG. 10). Additional details may also be contained within the service cycle data 402, for example as may be seen from FIG. 11 in particular, discrete levels of activities, in varying degrees of complexity may be involved for one or more of the options (e.g., 1022-1026) and parameters such as the cost, time, and personnel and/or internal/external service providers available to perform such activities may be incorporated within the service cycle data 402. In other embodiments, however, it should be understood that the service cycle data 402 may include any type of descriptive data associated with the service cycle supply chain of FIGS. 10-12 and 14, provided such may prove at least in part informative to analyzing at least a portion of the customer data 401, as described elsewhere herein. As a non-limiting example, the service cycle data may comprise various items of network management data, which inform the flow and integration of the service cycle data across the integrated infrastructure of system 20, as also described elsewhere herein. Still further, in any of these and still other embodiments, it should be understood that, upon receipt, the service cycle database 412 will store any such service cycle data 402 in a manner associated with at least the data module 400 and for provision (whether automatically, manually, or at a later time) to at least one of the modules 500-700, as will also be described in further detail below. Of course, in any of these and still other embodiments, a variety of alternative configurations could exist, as commonly known and understood in the art.

According to various embodiments, the internal provider database 413 may be configured to store and maintain a variety of internal provider data 403. Generally speaking, the internal provider data 403 may include capability data associated with particular providers (e.g., what service cycle activities they can perform), along with any other data that may be pertinent thereto. As a non-limiting example, in at least certain embodiments the internal provider is the provider of the centralized and integrated infrastructure of the system 20. As a result, at least a portion of the internal provider data 403 may further include asset or commodity item transport capabilities, beyond reverse cycle (e.g., repair, reuse, remanufacture, etc.) capabilities, as described elsewhere herein with reference to at least FIGS. 10-14. The internal provider data 403 may also, in these and still other embodiments, contain additional information associated with the internal provider acting as a prime contractor of sorts to facilitate centralized management of the system 20 described herein. Still further, in any of these and still other embodiments, it should be understood that, upon receipt, the internal provider database 413 will store any such internal provider data 403 in a manner associated with at least the data module 400 and for provision (whether automatically, manually, or at a later time) to at least one of the modules 500-700, as will also be described in further detail below. Of course, in any of these and still other embodiments, a variety of alternative configurations could exist, as commonly known and understood in the art.

According to various embodiments, the external provider database 414 may be configured to store and maintain a variety of external provider data 404. Generally speaking, the external provider data 404 may include service capability data associated with particular providers (e.g., what service cycle activities they can perform), along with any other data that may be pertinent thereto. As a non-limiting example, in at least certain embodiments the external provider data 404 may further comprise pre-negotiated agreements and terms thereof, as the external provider(s) may have entered with the provider of the system 20 (e.g., the internal provider). Such may, amongst additional data, include negotiated cost, rate, and any of a variety of reverse cycle option processing data, as may be pertinent for determining of optimal choices between multiple options, as undertaken by the analysis module 500, as described elsewhere herein. Further non-limiting examples of the degree of granularity of external provider data 404 that may be stored and maintained within database 414 may be seen in at least FIGS. 13-14, as will be described in further detail further below. Still further, in any of these and still other embodiments, it should be understood that, upon receipt, the external provider database 414 will store any such external provider data 404 in a manner associated with at least the data module 400 and for provision (whether automatically, manually, or at a later time) to at least one of the modules 500-700, as will also be described in further detail below. Of course, in any of these and still other embodiments, a variety of alternative configurations could exist, as commonly known and understood in the art.

According to various embodiments, the performance data database 415 may be configured to store and maintain a variety of performance data 405 associated with a network infrastructure that has been consolidated and integrated via the system 20, as described elsewhere herein. Generally speaking, the performance data 405 may include any of a variety of historical and/or actual network management data, as may have been generated by execution of the various tools of the system 20 and/or as acquired from one or more tools external to, but in communication with the system, as will be described in further detail elsewhere herein. Non-limiting examples of performance data 405 include detailed tracking data for movement of assets or commodity items within the supply chain loops in which the system 20 operates, service activity (e.g., return, reuse, repair, refurbishment, etc.) data, which may include still further non-limiting examples of yield data, cost data, time data, and actual data versus estimated values for each of the same. Further non-limiting examples of performance data 405 include network statistics, such as status updates from one or more integrated carriers, misroutes, missed scans, reroutes, and facility/personnel-related data. It should be understood that any of a variety of historical performance data for the system 20 may be incorporated within the performance data 405, for the primary purpose of using such according to various embodiments of the system 20, as described herein, for purposes of executing the intelligent visibility module 700 and the simulations contained therein. As a result, generally speaking, the performance data 405 may include any of a variety of combinations of network-oriented data that is configured to provide a comprehensive track and trace on all outbound flow and return flow, and to provide full visibility of end-to-end supply chain management including fulfillment, returns, repair loop, replenishment orders, and the like. Still further, in any of these and still other embodiments, it should be understood that, upon receipt, the performance data database 415 will store any such performance data 405 in a manner associated with at least the data module 400 and for provision (whether automatically, manually, or at a later time) to at least one of the modules 500-700, typically to at least the intelligent visibility module 700, as will also be described in further detail below. Of course, in any of these and still other embodiments, a variety of alternative configurations could exist, as commonly known and understood in the art.

According to various embodiments, the simulation data database 416 may be configured to store and maintain a variety of simulation data 406. Generally speaking, the simulation data 406 may include any of a variety of data associated with a plurality of data points within a service cycle supply chain operated in association with the various embodiments of the system 20 described herein. The data associated with the plurality of data points may be further coupled to internal provider data 403, external provider data 404, and/or customer data 401, so as to provide a predictive model of the service cycle network. As will be described in further detail elsewhere herein, the simulation data 406 may further comprise one or more parameters against which actual versus desired outcomes and/or performance are analyzed for purposes of, as a non-limiting example, identifying one or more discrepancies there-between. Such discrepancies, as will also be described in further detail elsewhere may be utilized by various embodiments of the system 20 to enable users thereof to proactively identify areas upon which improvements and/or initiatives should be focused, thus further contributing to the value of the system with regard to improved efficiency and effectiveness of managing the supply chain process, particularly in the reverse cycle loop, as illustrated in at least FIG. 10. Still further, in any of these and still other embodiments, it should be understood that, upon receipt, the simulation data database 416 will store any such simulation data 406 in a manner associated with at least the data module 400 and for provision (whether automatically, manually, or at a later time) to at least the intelligent visibility module 700, as will also be described in further detail below. Of course, in any of these and still other embodiments, a variety of alternative configurations could exist, as commonly known and understood in the art.

According to various embodiments, any of the previously described databases may be configured to store and maintain not only textually based data, but also graphically based data, as may be generated by the system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, network maps (e.g., as may be particular useful in the context of simulation and intelligent visibility), and the like, all as will be described in further detail elsewhere. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored in any of the various databases within the system 20, as may be desirable for various applications, to the extent such have not been previously described and/or allocated herein.

Summary of Exemplary System Operation

As indicated above, various embodiments of the service cycle management server 200 execute various modules (e.g., modules 400, 500, 600, 700) to provide an integrated platform and system 20 that dynamically manages the decision-making processes involved with execution of an asset service cycle, particularly so as to facilitate the handling thereof so as to achieve customer-defined parameters so as to provide an outcome-based model that shifts responsibility to the centralized system and the provider thereof.

According to the embodiment shown in FIG. 5, the service cycle management server 200 begins with the execution of the data module 400, which is configured to receive, store, manage, and transmit a variety of input data 410, the details of which have been described previously herein. In certain embodiments, at least a portion of the data is provided to the analysis module 500 for further processing, either automatically upon, for example, receipt of at least a portion of customer data 401, which may comprise a customer order or request for service, as may arise in particular applications. In at least the illustrated embodiment of FIG. 5, at least a portion of the input data 410, namely the performance data 405 and the simulation data 406 may be alternatively provided to the intelligent visibility module 700, which may, for example, use such for running one or more simulations of the performance of either the system or the customer's service cycle activities, whether upon request of the customer (e.g., via a request received via customer data 401) or otherwise (e.g., on a periodic basis, as may be desirable for certain applications). Of course, it should be understood that various alternatives may exist within the configured processes of the data module 400, all as will be described in further detail below.

In various embodiments, remaining with FIG. 5 and its illustration of the overall interactive nature of the various modules, the analysis module 500 is configured to receive various pieces of the input data 410, for example at least initially customer data 401 and service cycle data 402 and upon receipt thereof activate a service selection tool 510. In certain embodiments, the service selection tool 510 executes one or more algorithms upon the data, so as to identify an optimal service route (see FIG. 10, for example, reuse or refurbishment or repair) for an asset or commodity item being considered by the system 20. The identification may be based at least in part upon the customer data 401 and the service cycle data 402 in some embodiments, while in other embodiments additional and/or alternative data (e.g., performance data 405) may also be considered, although not expressly illustrated in FIG. 5.

The analysis module 500 is further configured, according to various embodiments, to execute a provider selection tool 520, which upon determination of the desired service route, as represented by the service selection data 515 of FIG. 5, further determines the optimal service provider for implementation of the one or more activities and/or events necessary to undertake the desired route. Exemplary providers may be seen in FIG. 12, as have been previously described herein, and as are further represented by the provider selection data 525 of FIG. 5, as generated by the tool 520 of the analysis module 500. In various embodiments, upon determination and identification of optimal service, routes, and providers therefor, the analysis module 500 is further configured to provide any generated data (e.g., 515, 525) to at least the report/execution module 600 for further processing.

In various embodiments, the report module 600 is configured to, upon receipt of service selection data 515 and provider selection data 525 activate an execution tool 610, which is configured to determine which of one or more available actions for implementation of the selections identified by the analysis module 500 are necessary and/or desired. In certain embodiments, the one or more available actions include generating one or more instructions 616 for implementation of the selections. As a non-limiting example, the execution tool 610 may generate instructions that detail specific steps to be taken by a service provider, whether internal or externally positioned, to implement the reverse cycle loop option (see FIG. 10) identified by the analysis module 500 as optimal under the circumstances at hand. In other embodiments, the instructions may be in a form so as to at least in part automatically initiate the implementation process.

In these and other embodiments, it should further be understood that the execution tool 610 may be configured to not only generate, but to also transmit and/or display the instructions 616 to one or more users of the system, whether they be the internal or external providers, the customer, or otherwise. Such transmittals may be via the one or more networks 130, as previously described herein, and such displays may be via one or more interfaces, whether a web-based portal or otherwise, as may be accessible via the one or more distributed computing devices 100 and/or distributed handheld devices 110, as also described previously herein. In certain embodiments the data generated, transmitted, and/or displayed by the tool 610 may be not only of instructions 616, but also of alerts 614 (whether audible, visual, textual, or otherwise) and/or reports 612 (whether visual, textual, or otherwise). In certain embodiments, such generations, transmittals, and/or displays may occur dynamically and/or automatically upon activation of the execution tool 610, as may be determined by any of a variety of parameters within the system 20. For example, a customer may want to be immediately notified (e.g., via an alert 614) of identification of a service and service provider by the analysis module 500 so as to coordinate other activities in parallel with the generation and transmittal of the instructions 616 to at least the selected provider. Of course, any of a variety of reporting and notification configurations may be envisioned, all as will be described in further detail elsewhere herein.

As may be seen from FIG. 5, the intelligent visibility module 700 is configured to, upon receipt of various components of input data 410, such as non-limiting examples of performance data 405 and simulation data 406, execute a simulation tool 710. The simulation tool 710 is configured according to various embodiments to execute one or more algorithms and/or business rule engines to generate intelligence data 715, which may in turn be used to generate one or more reports 612 (e.g., via the report/execution module 600), as previously described herein. The reports 612 may, in the context of the intelligence data 715 include one or more displays 1300, 1400, as may be seen in FIGS. 16 and 17, whereby actual data observed by the system is overlaid against customer preferences and/or desired outcomes so as to illustrate for the customer (e.g., a user of the system 20) end to end multi-provider network performance, bottlenecking or under-performing areas, suggested areas of improvement or optimization focus, and drill-down opportunities to refine focus. Of course, various alternatives may exist, all as will be described in further detail below.

Data Module 400

According to various embodiments, as previously mentioned herein, the data module 400 is configured to receive, store, manage, and transmit a variety of input data 410. Receipt may be from any of a variety of entities (e.g., a customer, an internal service provider, an external service provider, various users of the system 20, etc.) and transmission may be to one or more of the modules 500-700, as will be described in further detail below.

FIG. 6 illustrates steps that may be executed by the data module 400 according to various embodiments. Beginning with step 420, the data module 400 assesses whether any data (e.g., input data 410, which may include customer data 401, service cycle data 402, internal provider data 403, external provider data 404, performance data 405, simulation data 406, and the like, all as illustrated in FIG. 5) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the system 20 via an interface, whether web-based or otherwise) and upon receipt thereof, execute step 430.

As an initial non-limiting example, which has been referred to previously herein, the newly received input data 410 may comprise a customer repair/service request for preventative maintenance on an MRI machine, which request would be generally captured according to various embodiments within the customer data 401. The request may, amongst other aspects, indicate that certain replacement parts should be delivered based upon typical wear and tear of the machine. Service by an appropriate provider could also be requested and/or implied by the nature of the request. In certain instances, where service may be known to require movement of the MRI machine offsite for evaluation, the customer request may further include an indication that a temporary "fill-in" machine may be necessary. Such data within the request would be processed by the data module 400 during step 420, followed by transmittal of some portion of the same to the analysis module 500 in step 430, as will be described further below.

As another non-limiting example, the newly received input data 410 may comprise a customer replacement request for employee laptops within an organization operated by the customer, which would likewise generally be captured according to various embodiments within the customer data 401. The request may simply indicate that replacement "new model" laptops are required, perhaps dictated by terms of a periodic replacement agreement that the customer entered with a manufacturer of the laptops themselves. Such data within the request would likewise be processed by the data module 400 during step 420, followed by transmittal of some portion of the same to the analysis module 500 in step 430, as will be described further below.

As yet another non-limiting example, the newly received input data 410 may comprise an external service provider notification of changes to their service provider capabilities. Specifically, consider the scenario wherein an external refurbishment company has been forced to reduce staff/personnel numbers so as to minimize costs (for whatever reason), resulting in a lower volume capability than previously possible. Such data may impact various analyses performed by the analysis module 500, particularly in the context of identifying an optimal service selection route based upon customer-defined preferred outcomes. As a discrete example, the lower volume capability may result in the external service provider imposing a higher, per item, fee for refurbishment, which could, in turn, reduce overall customer yield for the refurbishment option, perhaps not making it the optimal choice under the algorithms and business rules executed by the analysis module 500. Further details in this regard will be described further below.

A still further non-limiting example may involve the receipt of performance-related data 405, which may be received in a near real-time fashion by the system 20 (or otherwise, as may be desirable). Upon receipt, such will, according to various embodiments, be forwarded to at least the intelligent visibility module, as such may alter modeling results previously generated by the simulation tool 710, as will also be described in further detail elsewhere herein. It should be understood through these series of non-limiting examples that regardless of the specific type and content of the input data 410 received, the data module 400 is generally configured to receive, manage, file, and process such data, including proper routing of the same to the one or more additional modules 500-700 of the system 20.

As previously mentioned, with reference again to FIG. 6, in any of these and still other various embodiments, if "newly received" input data 410 is identified, the data module 400 proceeds to step 430; otherwise the module proceeds into a static loop via step 425. During step 425, the data module 400 may be configured to passively stand by for receipt of new input data 410. In certain embodiments, the module 400 may, in step 425, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, the data module 400 is configured to transmit at least a portion of received input data 410 to at least the analysis module 500. In certain embodiments, the data module 400 may be configured to automatically perform step 430, while in other embodiments, the module may perform such only periodically, at an interval predetermined by one or more users of the system 20, as may be desirable for particular applications. In still other embodiments, the data module 400 may automatically transmit a portion of the data (e.g., customer data 401 and/or service cycle data 402), while another portion of the data (e.g., internal provider data 404 and/or external provider data 404) may be transmitted subsequently, for example, upon request therefor by the analysis module 500, as will be described in further detail below. Additional data may be alternative and/or additionally transmitted, either automatically or otherwise, to the intelligent visibility module 700, as will also be described elsewhere herein. Such data may, for example, include at least performance data 405 and/or simulation data 406, although still further in certain embodiments, at least some portion of customer data 401, service cycle data 402, and the like may be also transmitted to the intelligent visibility module 700. In any of these and still other embodiments, any portion of the input data 410 may be further transmitted to the report/execution module 600, whether automatically or upon request therefor, as may be desirable for certain applications.

Analysis Module 500

As previously described, upon receipt and/or retrieval of any portion of input data 410, the analysis module 500 is configured to determine an optimal service cycle routing option and an optimal provider therefor, based at least in part upon outcome-determinative parameters as may be pre-established by at least a customer/user of the system 20 described herein. Various embodiments of the analysis module 500 provide at least a service selection tool 510 and a provider selection tool 520 in this regard.

With reference now to FIG. 7, which illustrates various steps that may be executed by the analysis module 500, according to various embodiments the module is configured to begin in step 530 by receiving at least some portion of data from the data module 400. It should be understood that in certain embodiments, the analysis module 500 may be configured to periodically and/or continuously proactively retrieve and/or check for new data 410, as may be transmitted from the data module 400. In other embodiments, the analysis module 500 may merely passively await receipt of data from the data module, as may be desirable for particular applications.

According to various embodiments, data received in step 530 may comprise either input customer data 401 and/or service cycle data 402 although any of a variety of types of input data 410 may be received, as may be applicable in certain scenarios. Such data may be entered by a user via exemplary interface screen displays (not shown), which may be accessed by one or more users and/or customers of the system 20. In any of these and still other embodiments, upon receipt of data in step 530, the analysis module is configured to proceed to step 540, wherein a service selection tool 510 (see also FIG. 5) is executed. Otherwise, if no data is received in step 530, the module 500 proceeds to step 535, entering a static loop of sorts until new data is ultimately received and identified in step 530.

During step 540, the analysis module 500 is configured to, according to various embodiments, execute a service selection tool 510 to identify an optimal route or pathway within the reverse service cycle loop 1020 (see FIG. 10). In certain embodiments, the tool 510 is configured to execute one or more algorithms and/or business rules engines that are themselves configured to assess the plurality of input data 410 received therein. Customer-defined parameters, in particular desired outcomes, as may have been pre-established prior to execution of the service selection tool 510 are configured to inform the decision-making process, as such is executed in a substantially automated fashion via the tool 510. Several non-limiting examples, in this regard, prove informative.

Returning to the first non-limiting example of a preventative maintenance request from a customer for an MRI machine, during step 540 of FIG. 7, with reference also to FIG. 10, the request occurs during post-sales support stage 1018, upon receipt thereof, the analysis module 500 determines the various steps within the reverse loop cycle 1020 that may be desirable based upon the circumstances. In this example, the customer has established a parameter of no less than 5% yield for reverse cycle processing. As a result, the service selection tool 510 first assesses whether collection, test, and/or disassembly 1021 (see FIG. 10) will be necessary; if so, various options are then quantitatively and/or qualitatively analyzed. In this non-limiting example, based upon service cycle data 402, the cost of refurbishment is such that yield would be 4%; because such is less than the minimum 5% yield parameter established by the customer, refurbishment would thus be eliminated as an option. From a qualitative perspective, it may be determined, perhaps at least in part based upon additional customer-provided data, that remanufacture of the MRI machine and/or recycling of the component parts thereof aren't options that fall within the customer's business model, thus making them less than optimal.

Via such analysis under step 540, remaining with the non-limiting example of the MRI machine, the service selection tool 510 may determine that repair and reuse would both be viable with respect to the 5% minimum yield parameter, thus making either viable options for selection. In certain embodiments, additional parameters may exist within at least the customer data 401, for example a required turnaround time of less than 48 hours, 99% of the time, and such may further eliminate options such as repair, which could be delayed beyond 48 hours in certain instances based upon any of a variety of external factors.

It should be understood from above that the service selection data 515, as generated by the service selection tool 510 may thus include at least one optimal service route selection (e.g., in the MRI example, that of reuse or resale into the forward market cycle on an "as-is" basis). In certain embodiments, however, two or more service route selections may be deemed equally optimal in view of the quantitative and qualitative analysis of the service cycle route options alone, in which case it may be such that two or more viable options may be incorporated within the service selection data 515, for subsequent narrowing via the provider selection tool 520. In other embodiments, however, dependent upon the scope and content of the available input data 410, the service selection tool 510 may output a single optimal route (e.g., reuse), which may be in turn input into the provider selection tool 520 so as to determine the best provider therefor. It should be understood from these examples that the multiple tools 510, 520 within the analysis module 500 operate in a complementary fashion relative to one another and that, as such, the discrete calculations performed by each may be dynamically interrelated with one another in a varying degree, depending upon the specifics of particular scenarios.

As another non-limiting example, returning to the laptop replacement plan scenario previously introduced herein, during step 540 of FIG. 7, with reference also to FIG. 10, a request for replacement thereof causes execution of the service selection tool 510 for purposes of determining an optimal reverse cycle loop route. In this example, the tool 510 may be configured to determine whether collection 1021 is desirable, where for example exchange of the laptops is standard procedure according to a document such as the replacement plan agreement that may have been entered into between the customer and a manufacture of the laptops. The service selection tool 510 further assesses the various options (e.g., reuse, repair, refurbish, remanufacture, recycle, 1022-1026), assessing both qualitatively and quantitatively the implications of each with respect to both the disposal loop 1030 options and the forward (e.g., re-entry) loop 1010 options. For example, in one scenario, it may be determined by the tool 510 that the optimal route, based at least in part upon customer-established outcome preferences and/or parameters, may be to refurbish 80% of the laptops and to recycle the remaining 20% thereof. In one scenario it may be further determined that of the 80% to be refurbished, 50% of those will be reintroduced into the forward cycle 1010 via a secondary retail market, while the remaining 50% may be at least initially offered for resale internally (e.g., to employees and/or staff of the customer). Of the 20% slated for recycling, depending on a variety of factors, such as, for example condition of the laptop, some may be recycled on a component basis for at least some portion of value recapture while others may be fully or at least substantially destroyed. It should be understood from this example, that in addition to not just a single reverse cycle option (e.g., reuse) being determined by the tool 510 for the MRI machine, multiple options may likewise be selected and even implemented (as will be described elsewhere herein) where a combination of actions, versus a single action, may be determined optimal in view of at least the input data 410.

Returning now with focus on FIG. 7, during execution of step 540 according to various embodiments, the analysis module 500 may further execute step 545, wherein additional customer data 401 and/or service cycle data 402 may be proactively retrieved from the data module 400. With reference to the previously noted non-limiting examples, such may be necessary when, upon receipt of a replacement or maintenance request from a customer as the data received in step 530, the service selection tool 510 requires additional parameter-based data from which to determine, at least in part, the optimal service selection(s). In other embodiments, additional input data 410 other than the customer and/or service cycle data may be likewise retrieved, as may be desirable for certain applications.

In any of these and still other embodiments, upon execution of the service selection tool 510, the analysis module 500 is configured to generate service selection data 515, which operates, at least in part, as a further input to the provider selection tool 520 of the analysis module, as will be described in further detail below. In certain embodiments, the service selection data 515 may comprise at least an identification of the optimal service route (see FIG. 10), as identified by the service selection tool 510 during step 540. In other embodiments, the data 515 may additionally comprise at least some portion of the input data 410 (e.g., customer data 401), so as to further transmit the same to at least the provider selection tool 520.

In that regard, upon generation of the service selection data 515 during step 550 according to various embodiments, the analysis module 500 is configured to proceed to step 560, wherein a provider selection tool 520 (see FIG. 5) is executed. As may be understood from FIG. 7, in certain embodiments the tool 520 may further retrieve various portions of provider data 403-404 in step 565, which may be performed concurrently with step 560. In other embodiments, the provider data 403-404 may be transmitted along with the service selection data 515 otherwise to the provider selection tool 520, for example during step 530 as previously described herein.

Returning to the first non-limiting example of a preventative maintenance request from a customer for an MRI machine, during step 560 of FIG. 7, with reference also to FIGS. 11 and 12, the service selection data 515, particularly the selected reverse cycle route option identified therein is further analyzed via the execution of one or more algorithms and/or business rule engines so as to determine, based at least in part of the option identified, the optimal provider of the service associated therewith. With reference to FIG. 11 in particular, where, as previously described herein, it may be determined that repair 1023 and/or reuse 1022 would be viable reverse cycle loop options for the MRI machine, the provider selection tool 520 may be configured according certain embodiments to further assess sub-levels (e.g., Levels 1-8 of FIG. 11) associated therewith so as to further distill the precise route and action is optimal. In this manner, the provider selection tool 520 executes a more robust analysis than that previously described in the context of the service selection tool 510, although it should be understood that any of the analyses described with regard to further distilling the preciseness of the service activity could be interchangeably performed by either of the tools 510, 520 as may be desirable for particular applications.

That being said, the provider selection tool 520 (or alternatively the tool 510) may be configured via step 560 to determine whether the repair of the MRI machine of the non-limiting example would require relatively simplistic testing & diagnostics 1134 versus $2^{nd}$ tier repair 1135 and/or ALL repair 1136. As may be understood from viewing FIG. 12 in conjunction with FIG. 11, depending on the "level" of repair involved, the determination of an optimal provider may be impacted according to various embodiments. Indeed, in the non-limiting example of an MRI machine, in certain embodiments, an internal provider (e.g., the provider of the system 20 described herein or a subsidiary thereof) may be in a position to perform relatively more simplistic repair tasks, whereas more complex whole (e.g., ALL) repairs would be identified by the tool 520 as more suitable for an external third party service provider.

As should be understood, not only does the analysis performed by the provider identification tool 520 in this manner further impact one or more customer-imposed parameters (e.g., outcome-based desires), but such may further influence the optimal service selected by the tool 510. As a result, in at least certain embodiments, the executions of the tools 510, 520 may be an iterative process, whereby for example upon execution of the tool 520 and identification of an optimal service provider, the analysis module 500 may be further configured (although not illustrated in FIG. 7) to reconfirm, in a fashion) the conclusions identified by the tool 510, so as to ensure no discrepancies were introduced via execution of the tool 520. Of course, in still further embodiments (also not illustrated), the tools 510, 520, may be consolidated into a single tool that could concurrently and/or substantially simultaneously analyze all of the plurality of factors so as to identify an optimal service route and a provider therefor. Still other alternative configurations may also be envisioned, without departing the scope and nature of the present invention.

Returning to the non-limiting example of the laptop replacement plan proves instructive in this regard, as in the scenario wherein 20% of the laptops were identified for optimal recycling, upon execution of the provider selection tool 520, it may be identified that the costs imposed by the best available provider of that service are such that the customer's preference (e.g., outcome based parameter) of no less than 5% yield overall would no longer be met. In such a scenario, the analysis module 500 could be configured according to various embodiments so as to reassess the identifications of the service selection tool 510, whether by re-execution thereof, rerunning of certain algorithms applied thereby, or otherwise, so as to realign not only the selected service but also the selected provider with the customer's goals. It should be understood of course, that all of this may be configured according to various embodiments such that it is processed by the system 20 in a virtually seamless and automatic fashion, thereby placing responsibility for such decision making events with the single service provider of the integrated platform of the system 20 described herein.

With continued reference to the non-limiting example of the laptop replacement plan, it should further be understood that according to various embodiments the provider selection tool 520 may be configured to not only identify an optimal provider for service (e.g., repair, refurbishment, or recycling) of the asset or commodity item that is the subject of the customer request, but also with doing the same in additional contexts, all as are involved with the service cycle supply chain (see again FIG. 10). For example, the tool 520 may be further configured to determine an optimal provider for the replacement (e.g., new) laptops, which determination may be similarly influenced by one or more customer-defined outcomes and/or preferences, all of which may be further contained within at least the customer data 401 as previously described herein.

Still further, the tool 520 may be configured according to various embodiments to determine an optimal provider for transport/delivery of not only the assets or commodity items in need of reuse, recovery, or repair, but also of the replacement assets or commodity items, where such are necessary. The tool 520 may be further configured to determine initial ship locations, alternative ship locations, the level of service, and any of a variety of transport instructions, depending upon the identity of the carrier identified as optimal, as may be further desirable according to various applications. In at least one embodiment, the internal provider (e.g., the provider of the system 20) is not only a service provider but a common carrier entity such as UPS, FedEx, and the like, such that the internal provider is configured in at least those embodiments as the default selection for transit and delivery needs. Of course, customer-defined parameters may alter any such default selections, depending upon the particular scenario. It should be understood, however, that in this manner, as previously noted herein, the decision-making process surrounding management of the service cycle and in particular the reverse loop component thereof, lies primarily with the system 20 and the tools executed thereby.

Returning now to FIG. 7, upon execution of the provider selection tool 520, the analysis module 500 is configured to generate provider selection data 525, which may include, as non-limiting examples, identification of the optimal service provider entity (e.g., a common carrier, a third party service provider, and the like), identification of particular tasks to be performed by discrete entities where two or more "optimal" entities are identified, and any of a variety of additional data, as may be pertinent to facilitating implementation of the activities necessary to achieve a customer-defined outcome preference. In certain embodiments, it should be understood that the data 525 may additionally comprise at least some portion of the input data 410 (e.g., customer data 401, service cycle data 402, and the like), so as to further transmit the same to at least the report/execution module 600, as will be described in further detail below.

In that regard, upon generation of the provider selection data 525 during step 570 according to various embodiments, the analysis module 500 is configured to proceed to step 580, wherein at least the generated service selection data and provider selection data are transmitted (whether automatically or otherwise) to at least the report/execution module 600. With reference to the previously noted non-limiting examples, the transmission to the report/execution module 600 during step 580 may comprise at least an indication of the identified service action to be undertaken (e.g., reuse/repair of the MRI machine) and an identification of the service provider (e.g., external provider company "C") responsible for undertaking the same. In certain embodiments, additional data may be transmitted, as may be desirable for particular applications. For example, in at least one embodiment, an identification of a common carrier for transport of the MRI machine and/or any replacement thereof may be further embedded within the data transmitted to the report/execution module 600, for purposes as will become clearer further below.

With reference momentarily to FIGS. 13 and 14 it should be understood that the system 20 described herein is configured such that the service cycle management 1120 and the service cycle portfolio 1150 (e.g., service providers, whether internal or externally positioned) are managed by the single integrated system. As may be seen particularly from FIG. 13, certain tasks 1125 are shifted from being within the customer scope 1110 to falling within the integrated service (e.g., system 20) provider's responsibilities as a single-point-of contact for service cycle management 1120. Such tasks 1125 include the non-limiting examples of fulfillment order creation, data integration, customer order management, replenishment ordering, and network management, all as have been described rather extensively previously herein.

From FIG. 13, with reference particularly to the service cycle portfolio 1150, it should be understood that the analysis module 500, when determining the optimal service provider in step 560 (as previously described herein), may take into account a plurality of factors, any of which may be populated via associated data (within the data module 400 or otherwise), so as to inform the algorithms and/or business rule engines executed by the module 500. One non-limiting example illustrated in FIG. 13 includes parcel transport services 1151, which may be outgoing parcel and/or returns transportation, as has been previously described herein. In at least one embodiment, as should be understood from FIG. 13, such transportation services may be provided by the system provider (e.g., an internal service provider); of course, in other embodiments, external transportation providers may be utilized, depending upon a variety of factors. Other non-limiting examples include freight forwarding 1152 (including customs brokerage assistance and importer/exporter of record documentation), contract logistics capabilities 1153 (including forward stock locations (FSL), courier services, etc.), store front features 1154 (including pickup/drop off alternative delivery capabilities (PUDO/ADL)), component repair capabilities of a first external service provider 1155, disposal and liquidation capabilities of a second external service provider 1156, inventory planning/replenishment capabilities of a third external service provider 1157, and third party transportation services 1158, as previously noted. Any of these and still other parameters may be considered by the analysis module 500 during the course of executing at least the provider selection tool 520, as described elsewhere herein.

With reference further to FIG. 14, an exemplary system infrastructure 1200 of system 20 is illustrated, indicating further details within the service cycle data 402 and the internal/external provider data 403-404, as may be utilized during execution of the various tools within the analysis module 500. In particular, the service cycle details 1205 illustrate that transportation services may include parcel, freight, brokerage, and network planning tasks, while repair service options may include shop floor service, screening/repair services, installation base services, warranty parameters, kitting guidelines, and technician management considerations, all as may be influential to some degree upon the "rating" of a particular reverse service loop "option" as optimal versus not. In other words, any of the various sub-levels of data details 1205 illustrated in FIG. 14 may be further inputs into the algorithms and/or business rule engines executed by the service selection tool 510 of the analysis module 500. Similarly, any of a variety of additional details 1210 regarding a plurality of service providers (e.g., Co. #1, Co. #2, etc.) may be used as input parameters by at least the provider selection tool 520, down to the level of assessing (as a non-limiting example) the efficiency and effectiveness of available systems (e.g., A, B, C, D, E, F, etc.) that may be further identified and/or selected by the tool for use in a particular scenario, as may be desirable based at least in part upon customer-defined outcome parameters, as described elsewhere herein.

Report/Execution Module 600

With reference to FIG. 8, according to various embodiments, the report/execution module 600 is configured to generally determine whether one or more actions should be taken so as to implement, at least in part, the action plan (e.g., identified service steps and service provider) developed by the tools 510, 520 of the analysis module 500.

Beginning with step 620, the report/execution module 600 is configured according to various embodiments to assess whether any data (e.g., service selection data 515 and/or provider selection data 525, which may be generated by the various tools of the analysis module 500, as previously described herein) has been received by the module. In certain embodiments, the report/execution module 600 makes this assessment by periodically scanning one or more databases (see FIG. 4) associated with the data module 400 and by identifying some portion of data within one or more of the databases that was not present during a previous periodic scan under step 620. Of course, alternative configurations may be envisioned, wherein, as a non-limiting example, the report/execution module 600 may actively receive data directly from the analysis module 500 (as illustrated in at least FIG. 5).

With focus again on FIG. 8, in any of these and still other various embodiments, if "newly received" data is identified in step 620, the report/execution module 600 proceeds to step 630; otherwise the module proceeds into a static loop via step 625, pending receipt of new data. During step 625, the report/execution module 600 may be configured to passively stand by for receipt of data. In certain embodiments, the report/execution module 600 may, in step 625, periodically (e.g., every 5 seconds, or at any desirable interval) proactively ping one or more databases contained within the data module 400 and/or the analysis module 500, as may be desirable. Various alternative data monitoring configurations may be envisioned, without departing the scope and nature of the present invention, as such are commonly known and understood in the art.

During step 630, the report/execution module 600 is configured to run an execution tool 610, which generally speaking is configured to determine the type of data that has been received by the module. If the presence of service or provider selection data 515, 525 is determined, the module proceeds to step 650 and 660, whereby one or more reports 612, alerts 614, and/or instructions 616 may be generated. Otherwise, if instead intelligence data 715 is identified as being present, the module proceeds to step 680, whereby it is determined first if any proactive action is desired, depending upon at least in part one or more customer or user defined parameters.

Focusing momentarily upon the process with regard to identification of service or provider selection data 515, 525, the execution tool 610 may be configured to generate one or more reports 612, for example if a customer requests such upon identification of a service action and a provider therefor. In certain embodiments, a customer or user of the system 20 may further request transmittal of an alert 614, as to keep them informed, but not necessarily of every detail regarding the update in data being analyzed. Still further exemplary reports 1240 and alerts 1220 may be seen in FIGS. 15B and 15A, respectively.

According to various embodiments, the execution tool 610 of the report/execution module 600 may be further configured to generate one or more instructions 616, which may be configured to inform one or more additional parties of future steps and/or activities to be performed so as to implement the service cycle route identified by the analysis module 500. In certain embodiments, the instructions 616 may be transmitted substantially automatically to one or more parties identified as service providers, in view of the analysis performed by the analysis module, as previously described herein. In some embodiments, the instructions 616 may be textual and/or graphically based; although in other embodiments, the instructions may comprise computer program code, at least in part. In such embodiments, it should be understood that the instructions 616 may be configured to automatically and at least in part virtually or electronically initiate the process of implementing the tasks and/or activities associated with the service cycle route identified by the analysis module 500.

It should also be understood, returning to FIG. 8, that according to various embodiments, during step 660, any combination of the reports 612, alerts 614, and/or instructions 616 may be generated, as may be influenced by previously defined parameters, whether by the customer or other users of the system 20. For example, a customer who has placed an order may have a pre-established rule that they receive an alert 614 of all identifications by the analysis module 500 of services and/or providers thereof. Simultaneously and/or alternatively, a service provider may request a report alongside a report when they are identified as an optimal provider and thus tasked with implementation of the steps to be performed going through the reverse cycle loop. Simultaneously and/or alternatively, the service provider may also receive electronically coded instructions 616 that initiate, behind the scenes, at least some portion of the next steps for implementation of and satisfaction of the customer-requested outcome. In this manner, it should be understood that the various reports 612, alerts 614, and instructions 616 provide alternatives so as to appropriately communicate with various users of the system, as such users may desire. Of course, additional and/or alternative formats of reporting and/or communication may be envisioned without departing from the scope and intent of the present invention, and any of those, like those described previously herein, may be implemented in a manual or automatic fashion, electronically or otherwise, however as may be desirable.

Continuing with FIG. 8, it may be further seen that upon generation of the various reports 612, alerts 614, and/or instructions 616 in step 660, the report/execution module 600 may be further configured to transmit during step 690 the same to at least the data module 400 for updating thereof. Of course, as has been previously mentioned herein, the transmission of data and/or any generated outputs, which occurs in step 690 may be not only to the data module for purposes of maintaining the same, but also to any of a number of various users of the system 20, as may be desirable according to particular applications.

Turning momentarily to steps 670 and 680 of FIG. 8, wherein instead of service or provider selection data 515, 525, it is intelligence data 715 that is received from the intelligent visibility module 700 (as will be described in further detail below), the tool 610 of the module 600 is configured, as previously described herein to assess whether one or more reports 612, alerts 614, and/or instructions 616 are necessary. For example, if the intelligence data indicates under-performing areas within the system network, a customer may have requested to be notified in that regard, which would thus generate at least an alert 614, and possibly a report 612, depending upon precise parameters, as may have been pre-established by the customer. As another example, instructions 616 may be generated for, at least in part, automatically updating the analysis performed by the analysis module 500, so as to rectify the under-performing area going forward. As described with respect to the service and/or provider selection data, the report/execution module 600 may be configured in various embodiments to automatically (or otherwise) transmit any generated data to at least the data module 400 and still further (as desirable) to one or more users of the system. Of course, still other scenarios may be envisioned, without departing from the scope and nature of the present invention.

Intelligent Visibility Module 700

With reference to FIG. 9, according to various embodiments, the intelligent visibility module 700 is configured to establish an intelligent visibility service that provides an additional analytics tool that moves the transparency provided for multi-provider reverse networks from descriptive to prescriptive.

With reference momentarily to FIGS. 16 and 17, exemplary displays 1300, 1400 may be provided via a customer/user interface associated with the system 20, whether online or otherwise. The displays 1300, 1400 are generally configured to provide a simplified network representation that uses system provider data (e.g., tracking, network management, and the like) and customer business rules to illustrate at least end to end multi-provider network performance, bottlenecking or under-performing areas, suggested areas of improvement or optimization focus, and drill-down opportunities to refine focus. In this manner, the intelligent visibility service can provide a network simulation for managing service cycle operations, versus predicting the same. In certain embodiments, the intelligent visibility data may be overlaid upon actual track and trace data so as to identify discrepancies, bottlenecks, and/or underperformance. In FIG. 15, it may be seen that the intelligent visibility data may be further overlaid upon a geographical map indicative of physical locations of various nodes (e.g., parties, systems, facilities) integrated within system 20. Different lines between successive nodes may be identified as optimal 1330 (e.g., perhaps green coded), in need of improvement 1320 (e.g., perhaps yellow coded), and creating issues 1310 (e.g., perhaps red coded). FIG. 14 illustrates an alternative display according to various embodiments, where performance between network nodes may be rated on a "traffic light" scale as either red 1410, yellow 1420, or green 1430.

Returning to FIG. 9, with the context of FIGS. 16 and 17, various embodiments of the intelligent visibility module 700 are configured to assess whether any data (e.g., actual performance data 405 (whether in near-real-time or otherwise) and/or simulation data 406, as based as least in part upon pre-established user/customer parameters, as described elsewhere herein) has been received by the module. In certain embodiments, the intelligent visibility module 700 makes this assessment by periodically scanning one or more databases (see FIG. 4) associated with the data module 400 and by identifying some portion of data within one or more of the databases that was not present during a previous periodic scan under step 720. Of course, alternative configurations may be envisioned, wherein, as a non-limiting example, the intelligent visibility module 700 may actively receive data directly from at least one of the data module 400 and/or the analysis module 500, as may be desirable for particular applications.

With focus again on FIG. 9, in any of these and still other various embodiments, if "newly received" data is identified in step 720, the intelligent visibility module 700 proceeds to step 730; otherwise the module proceeds into a static loop via step 725, pending receipt of new data. During step 725, the intelligent visibility module 700 may be configured to passively stand by for receipt of data. In certain embodiments, the intelligent visibility module 700 may, in step 725, periodically (e.g., every 5 seconds, or at any desirable interval) proactively ping one or more databases contained within the data module 400, as may be desirable. Various alternative data monitoring configurations may be envisioned, without departing the scope and nature of the present invention, as such are commonly known and understood in the art.

During step 730 according to various embodiments, the intelligent visibility module 700 is configured to execute a simulation tool 710, which is configured to compare actual observed data associated with any of a variety of parameters within the system to desired outcomes, parameters, and the like, as may be pre-established by, for example, a customer that uses the system 20 described herein. As a non-limiting example, as has been previously mentioned herein, a customer may want resolution of a request within 48 hours, 99% of the time, whether that involves a return, a repair of an asset or commodity item, or a replenishment order. In certain embodiments, when comparing actual data against this parameter, the simulation tool 710 may identify certain instances wherein the parameter was not satisfied, whether in full or in part. Such identifications are documented according to various embodiments as intelligence data 715, as illustrated with step 740 of FIG. 9. Any of a variety of possible content for the intelligence data 715 may be envisioned, based largely upon the previous disclosures herein, but such may be, for example, associated with end to end multi-provider network performance, bottlenecking or under-performing areas, suggested areas of improvement or optimization focus, and drill-down opportunities to refine focus.

With reference momentarily again to FIGS. 16 and 17, it should be further understood that the intelligence data 715 of step 740 may include additional data beyond the mere identification of problematic areas and/or areas for potential improvement/focus, as such may be derived from at least the simulation data 405 provided via the data module 400. For example, such data may be geographical map and node data, illustrative of a network across which the system 20 operates, such that the areas of concerned, as may be identified within step 730 may be displayed to a customer and/or user of the system in a meaningful fashion, as will be described in further detail below.

Returning to FIG. 9, it should be understood that upon generation of intelligence data 715 during step 740, various embodiments of the intelligent visibility module 700 are further configured to, in step 750, transmit the same to at least the execution tool 610 of the report/execution module 600. Of course, in certain embodiments, the intelligence data 715 may be alternatively and/or additionally transmitted to any of a variety of elements within the system 20 described herein. However, where transmission occurs to at least the tool 610, such may be configured to further distribute the same in accordance with one or more pre-established parameters, as may be set by customers and/or users of the system. For example, a customer may wish to be notified in a near real-time basis of any under-performing areas, such that internal customer groundwork may be efficiently and timely laid for future initiatives that may otherwise have not been sufficiently focused on the under-performing areas. Of course, any of a variety of scenarios exist, and it should be understood that the intelligence data 715 is generally configured to assist users of the system with planning, providing valuable insight for future initiatives to improve efficiency and effectiveness of service cycle supply chain tasks and activities.

With reference to FIG. 9, if during step 770, the intelligent visibility module 700 determines that one or more reports, alerts, and/or instructions are necessary, such may be generated via step 780 and further transmitted in step 790, whether to the data module 400 and/or one or more users of the system. It should be understood that the operations of steps 770-790, although illustrated in the context of being performed by the intelligent visibility module 700, may in certain embodiments be performed by the analysis module 600, as illustrated in FIG. 8 and previously described herein. It should further be understood that, regardless of which module (600, 700) that performs the report/alert/instruction generation, each may perform such in substantially the same fashion, dependent of course upon any of a variety of customer-established parameters, all as has been previously described herein.

With reference again to FIGS. 16 and 17, exemplary reports 612 in this context may be understood, via displays 1300 and 1400. In certain embodiments, the intelligent visibility data may be overlaid upon actual track and trace data so as to identify discrepancies, bottlenecks, and/or underperformance. In FIG. 15, it may be seen that the intelligent visibility data may be further overlaid upon a geographical map indicative of physical locations of various nodes (e.g., parties, systems, facilities) integrated within system 20. Different lines between successive nodes may be identified as optimal 1330 (e.g., perhaps green coded), in need of improvement 1320 (e.g., perhaps yellow coded), and creating issues 1310 (e.g., perhaps red coded). FIG. 14 illustrates an alternative display according to various embodiments, where performance between network nodes may be rated on a "traffic light" scale, as red 1410, yellow 1420, or green 1430. All of these and still further features of the intelligent visibility service will be described in further detail elsewhere herein.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shipping request system for intelligently evaluating one or more parameters of a post-sales reverse service cycle loop within a supply chain management infrastructure associated with a multi-provider network, the system comprising:
    one or more memory storage areas containing:
        customer requests for post-sales reverse service cycle support of one or more physical components to be repaired, refurbished, or recycled within a reverse service cycle loop;
        reverse service cycle data that tracks repair, refurbishment, or recycling of the one or more physical components in real-time via service tasks executed by a service provider within the reverse service cycle loop, wherein the reverse service cycle data includes parameters of the service tasks within the reverse service cycle loop and parameters of value recapture targets; and
        simulation data associated with the one or more physical components within the reverse service cycle loop, wherein the simulation data include predefined thresholds for the parameters of the service tasks; and
    one or more computer processors configured to:
        obtain the customer requests, the reverse service cycle data, and the simulation data from the one or more memory storage areas;
        determine a route comprising one or more of the service tasks for repair, refurbishment, or recycling within the reverse service cycle loop in near real-time with obtaining the customer requests, the route providing a greatest expected recapture of remaining value of the one or more physical components of the customer requests, wherein the route providing the greatest expected recapture of remaining value of the one or more physical components is identified based on an expected recapture of remaining value from the one or more physical components as determined for each of repair, refurbishment, and recycling relative to the parameters of value recapture targets;
        assign one of the service providers for the execution of the one or more of the service tasks of the route for the greatest expected recapture of remaining value of the one or more physical components;
        generate instructions to automatically execute the one or more of the service tasks of the route for repair, refurbishment, or recycling of the one or more physical components within the reverse service cycle loop in response to the customer requests obtained;
        dynamically identify one or more discrepancies in real-time within the reverse service cycle loop, wherein the one or more discrepancies indicate the parameters within the reverse service cycle data that tracks repair, refurbishment, or recycling of the one or more physical components in real-time diverge relative to the predefined thresholds for the parameters within the simulation data;
        generate one or more representations of the one or more discrepancies identified within the reverse service cycle loop and one or more areas within the reverse service cycle loop for future initiatives to mitigate the one or more discrepancies identified;
        generate one or more instructions to automatically execute the one or more of the service tasks for repair, refurbishment, or recycling of the one or more physical components to mitigate the one or more discrepancies identified;
        generate one or more notifications of the one or more discrepancies for delivery to a user of the system;
        determine a new route comprising the one or more of the service tasks for repair, refurbishment, or recycling within the reverse service cycle loop, the new route providing the greatest expected recapture of remaining value of the one or more physical components of the customer requests while mitigating the one or more discrepancies; and
        when another customer request is subsequently received, assign one of the service providers for the execution of the one or more of the service tasks based on the new route comprising the one or more of the service tasks for repair, refurbishment, or recycling within the reverse service cycle loop.

2. The system of claim 1, wherein the predefined thresholds for the parameters of the service tasks comprise a requirement that all of the customer requests for post-sales reverse service cycle support be handled within 48 hours of receipt of the customer requests, 99% of the time.

3. The system of claim 1, wherein the one or more representations are configured to provide end-to-end visibility of the multi-provider network within the supply chain management infrastructure.

4. The system of claim 1, wherein the one or more representations are configured to identify one or more bottlenecks within the multi-provider network within the supply chain management infrastructure.

5. The system of claim 1, wherein the one or more representations are configured to identify one or more under-performing areas within the multi-provider network within the supply chain management infrastructure.

6. The system of claim 1, wherein:
the one or more representations are configured to identify at least one of one or more bottlenecks, under-performing areas, or areas of suggested improvement or optimized focus; and
the one or more discrepancies within the one or more representations are overlaid upon the simulation data.

7. The system of claim 1, wherein the one or more representations are overlaid upon the simulation data of the multi-provider network within the supply chain management infrastructure.

8. The system of claim 7, wherein the overlaid one or more representations comprises a plurality of nodes within the multi-provider network and each of one or more pathways between each of the plurality of nodes is labeled based upon the one or more discrepancies.

9. The system of claim 8, wherein the labeling upon the one or more pathways between each of the plurality of nodes comprises a traffic-light pattern indicator.

10. The system of claim 9, wherein the traffic-light pattern indicator is configured such that a red-light illustration is representative of a severe discrepancy, a yellow-light illustration is representative of a minor discrepancy, and a green-light illustration is representative of no discrepancies.

11. The system of claim 7, wherein the one or more representations and the simulation data is further overlaid relative to a geographic map, the geographic map being indicative of relative locations of each of a plurality of nodes within the multi-provider network within the supply chain management infrastructure.

12. The system of claim 1, wherein the one or more notifications are generated in response to identifying the one or more discrepancies, wherein the one or more notifications comprise data indicative of the same.

13. The system of claim 12, wherein the one or more notifications are automatically generated and the one or more computer processors are further configured to transmit the one or more notifications to the one or more users of the system.

14. The system of claim 12, wherein the one or more notifications comprise one or more of an alert or a report.

15. The system of claim 1, wherein the one or more instructions are further configured to provide the one or more users of the system with an end-to-end intelligent visibility of the network and to assist the one or more users with identifying one or more initiatives to address the one or more discrepancies.

16. The system of claim 15, wherein the one or more computer processors are further configured to transmit at least a portion of the one or more instructions to the one or more users of the system.

17. A computer-implemented method for intelligently evaluating one or more parameters of a post-sales reverse service cycle loop within a supply chain management infrastructure associated with a multi-provider network, said method comprising:
receiving and storing within one or more memory storage areas, customer requests for post-sales reverse service cycle support of one or more physical components to be repaired, refurbished, or recycled within a reverse service cycle loop;
receiving real-time reverse service cycle data that tracks repair, refurbishment, or recycling of the one or more physical components in real-time via service tasks executed by service providers within the reverse service cycle loop, the real-time data comprising parameters of the service tasks within the reverse service cycle loop executed by the service providers, wherein the service tasks comprise at least one of repair, refurbishment, or recycling of the one or more physical components;
receiving parameters of value recapture targets;
receiving and storing, within the one or more memory storage areas, simulation data associated with the one or more components within the reverse service cycle loop, wherein the simulation data includes predefined thresholds for the parameters of the service tasks;
determining a route comprising one or more of the service tasks for repair, refurbishment, or recycling within the reverse service cycle loop in near real-time with receiving the customer requests, the route providing a greatest expected recapture of remaining value of the one or more physical components of the customer requests, wherein the route providing the greatest expected recapture of remaining value of the one or more physical components is identified based on an expected recapture of remaining value from the one or more physical components as determined for each of repair, refurbishment, and recycling relative to the parameters of value recapture targets;
assigning one of the service providers for the execution of the one or more of the service tasks of the route for the greatest expected recapture of remaining value of the one or more physical components;
generating, via one or more computer processors in communication with the one or more memory storage areas, instructions to automatically execute the one or more of the service tasks of the route for repair, refurbishment, or recycling of the one or more physical components within the reverse service cycle loop in response to the one or more customer requests obtained;
dynamically identifying, via at least one computer processor, one or more discrepancies in real-time within the reverse service cycle loop, wherein the one or more discrepancies indicate that the parameters within the real-time reverse service cycle data that tracks repair, refurbishment, or recycling of the one or more physical components in real-time diverge relative to the predefined thresholds for the parameters within the simulation data;
generating, via said at least one computer processor, one or more representations of the one or more discrepancies identified within the reverse service cycle loop and one or more areas within the reverse service cycle loop for future initiatives to mitigate the one or more discrepancies identified;
generating one or more additional instructions to automatically execute the one or more of the service tasks for repair, refurbishment, or recycling of the one or more physical components to mitigate the one or more discrepancies identified;
generating, via said at least one computer processor, one or more notifications of the one or more discrepancies to one or more users;
determining a new route comprising the one or more of the service tasks for repair, refurbishment, or recycling within the reverse service cycle loop, the new route providing the greatest expected recapture of remaining value of the one or more physical components of the customer requests while mitigating the one or more discrepancies; and
when another customer request is subsequently received, assign one of the service providers for the execution of the one or more of the service tasks based on the new route comprising the one or more of the service tasks for repair, refurbishment, or recycling within the reverse service cycle loop.

18. A non-transitory computer program product comprising at least one computer-readable storage medium having computer-readable program code portions embodied therein, the computer-readable program code portions comprising:
one or more executable portions configured for:
receiving customer requests for post-sales reverse service cycle support of one or more physical components to be repaired, refurbished, or recycled within a reverse service cycle loop;
receiving a plurality of data, wherein the plurality of data comprises:
real-time reverse service cycle data that tracks repair, refurbishment, or recycling of the one or more physical components in real-time via service tasks executed by service providers within the reverse service cycle loop, wherein the reverse service cycle data includes parameters of the service tasks executed by the service providers within the reverse service cycle loop, wherein the service tasks comprise at least one of repair, refurbishment, or recycling;
parameters of value recapture targets; and
simulation data associated with the one or more physical components within the reverse service cycle loop, wherein the simulation data includes predefined thresholds for the parameters of the service tasks;
determining a route comprising one or more of the service tasks for repair, refurbishment, or recycling within the reverse service cycle loop in near real-time with receiving the customer requests, the route providing a greatest expected recapture of remaining value of the one or more physical components of the customer requests, wherein the route providing the greatest expected recapture of remaining value of the one or more physical components is identified based on an expected recapture of remaining value from the one or more physical components as determined for each of repair, refurbishment, and recycling relative to the parameters of value recapture targets;
assigning one of the service providers for the execution of the one or more of the service tasks of the route for the greatest expected recapture of remaining value of the one or more physical components;
generating one or more instructions to automatically execute the one or more of the service tasks of the route for repair, refurbishment, or recycling of the one or more physical components within the reverse service cycle loop in response to the customer requests obtained;
dynamically identifying one or more discrepancies in real-time within the reverse service cycle loop, wherein the one or more discrepancies indicate parameters within the real-time reverse service cycle data that tracks repair, refurbishment, or recycling of the one or more physical components in real-time diverge relative to the predefined thresholds for the parameters within the simulation data generating one or more representations of the one or more discrepancies identified within the reverse service cycle loop and one or more areas within the reverse service cycle loop for future initiatives to mitigate the one or more discrepancies identified;
generating one or more instructions to automatically execute the one or more of the service tasks for repair, refurbishment, or recycling of the one or more physical components to mitigate the one or more discrepancies identified;
in response to not identifying one or more discrepancies, generating one or more notifications of the one or more discrepancies identified within the reverse service cycle loop for delivery to one or more users;
determine a new route comprising the one or more of the service tasks for repair, refurbishment, or recycling within the reverse service cycle loop, the new route providing the greatest expected recapture of remaining value of the one or more physical components of the customer requests while mitigating the one or more discrepancies; and
when another customer request is subsequently received, assign one of the service providers for the execution of the one or more of the service tasks based on the new route comprising the one or more of the service tasks for repair, refurbishment, or recycling within the reverse service cycle loop.

* * * * *